(12) United States Patent  
Olson

(10) Patent No.: US 7,275,719 B2
(45) Date of Patent: Oct. 2, 2007

(54) WIND DRIVE APPARATUS FOR AN AERIAL WIND POWER GENERATION SYSTEM

(76) Inventor: Gaylord G. Olson, 273 Jefferson Rd., Princeton, NJ (US) 08540

( * ) Notice: Subject to any disclaimer, the term of this patent is extended or adjusted under 35 U.S.C. 154(b) by 0 days.

(21) Appl. No.: 11/673,199

(22) Filed: Feb. 9, 2007

(65) Prior Publication Data

US 2007/0126241 A1   Jun. 7, 2007

Related U.S. Application Data

(63) Continuation-in-part of application No. 11/307,890, filed on Feb. 27, 2006, now Pat. No. 7,188,808, which is a continuation-in-part of application No. 11/164,512, filed on Nov. 28, 2005.

(51) Int. Cl.
*B64C 31/06* (2006.01)
(52) U.S. Cl. .................. 244/155 A; 244/153 R
(58) Field of Classification Search ............. 244/1 TD, 244/33, 152, 153 R, 155 A; 320/101; 290/44, 290/55
See application file for complete search history.

(56) References Cited

U.S. PATENT DOCUMENTS

| 3,086,739 | A |   | 4/1963  | Barber |
|-----------|---|---|---------|--------|
| 3,227,398 | A |   | 1/1966  | Struble, Jr. |
| 3,229,517 | A |   | 1/1966  | Smith |
| 3,887,817 | A |   | 6/1975  | Steelman |
| 3,924,827 | A |   | 12/1975 | Lois |
| 3,987,987 | A |   | 10/1976 | Payne et al. |
| 4,073,516 | A |   | 2/1978  | Kling |
| 4,076,190 | A |   | 2/1978  | Lois |
| 4,084,102 | A |   | 4/1978  | Fry |
| 4,124,182 | A |   | 11/1978 | Loeb |
| 4,450,784 | A |   | 5/1984  | Mellinger |
| 4,497,272 | A |   | 2/1985  | Veazey |
| 4,892,272 | A |   | 1/1990  | Hadzicki |
| 5,213,289 | A | * | 5/1993  | Barresi ..................... 244/145 |
| 5,417,390 | A | * | 5/1995  | Southwick ............. 244/155 A |
| 5,893,537 | A |   | 4/1999  | Lee |
| 5,931,416 | A |   | 8/1999  | Carpenter |
| 6,003,816 | A |   | 12/1999 | Lee |
| 6,072,245 | A |   | 6/2000  | Ockels |
| 6,254,034 | B1 |  | 7/2001  | Carpenter |
| 6,364,251 | B1 | * | 4/2002 | Yim ....................... 244/153 R |
| 6,523,781 | B2 |  | 2/2003  | Ragner |
| 6,616,402 | B2 |  | 9/2003  | Selsam |
| 6,781,254 | B2 |  | 8/2004  | Roberts |
| 6,925,949 | B1 |  | 8/2005  | Phillips |
| 2002/0167702 | A1 | | 11/2002 | Badesha et al. |
| 2005/0046197 | A1 | | 3/2005 | Kingsley |
| 2006/0118020 | A1 | * | 6/2006 | Sohy ....................... 114/102.1 |

\* cited by examiner

*Primary Examiner*—Rob Swiatek
(74) *Attorney, Agent, or Firm*—Ancel W. Lewis, Jr.

(57) ABSTRACT

Wind driven apparatus for an aerial power generation system include driven elements and controls. The driven elements are configured and shaped to provide maximum force from both lift and drag during the downwind phase of operation and minimum force during the upwind phase. The driven elements have a sail portion with a leading edge and a trailing edge. The controls change the driven elements between high force configurations for downwind operation and low force configurations for upwind operation, adjust the pitch and azimuth angles of the driven elements, and control the camber.

20 Claims, 19 Drawing Sheets

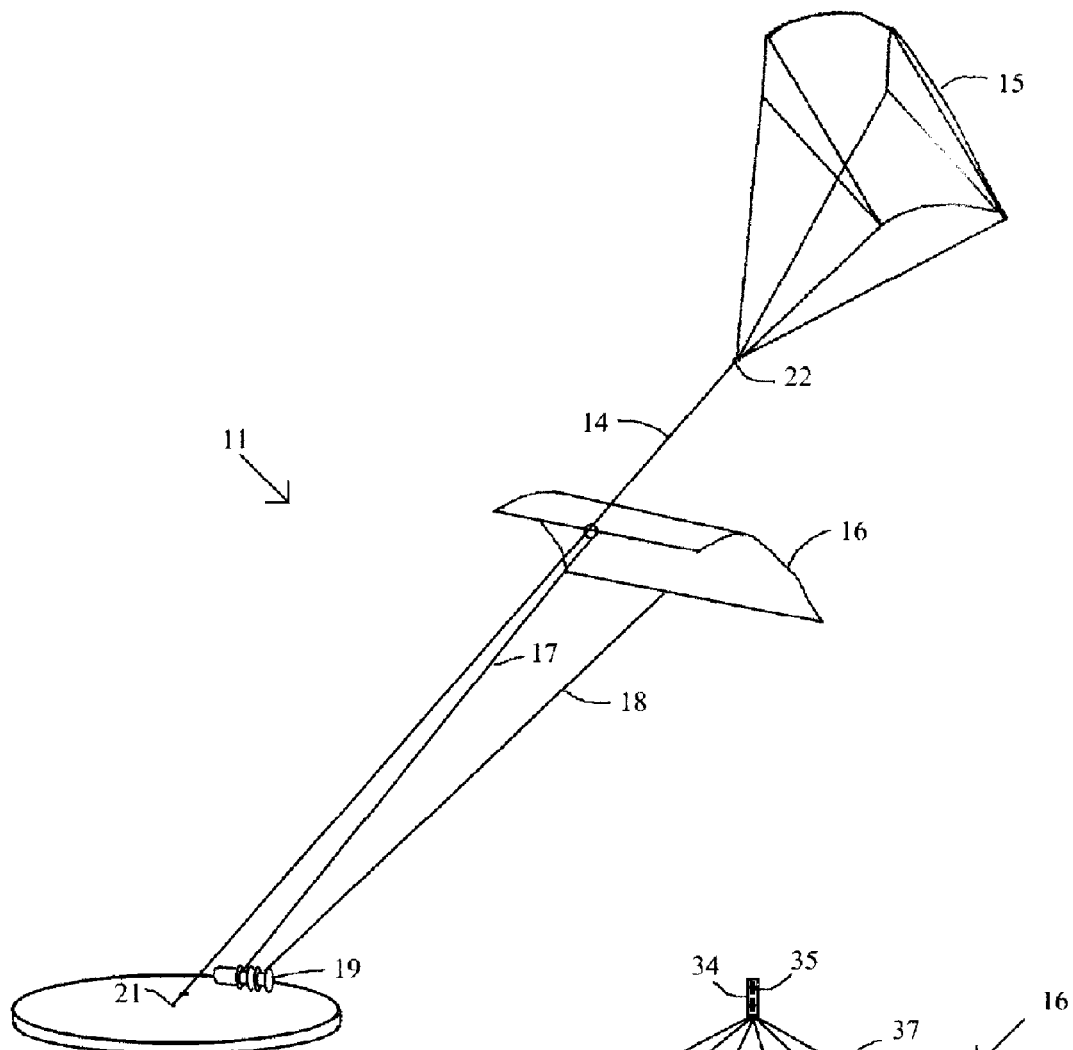
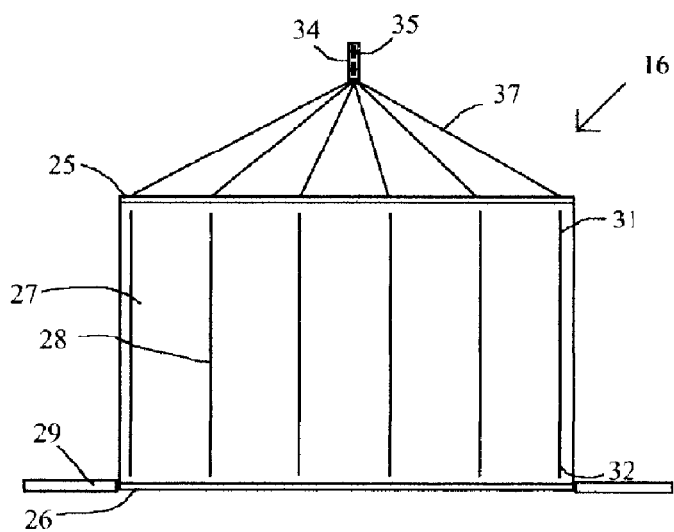
*Fig. 1*
*Fig. 2*

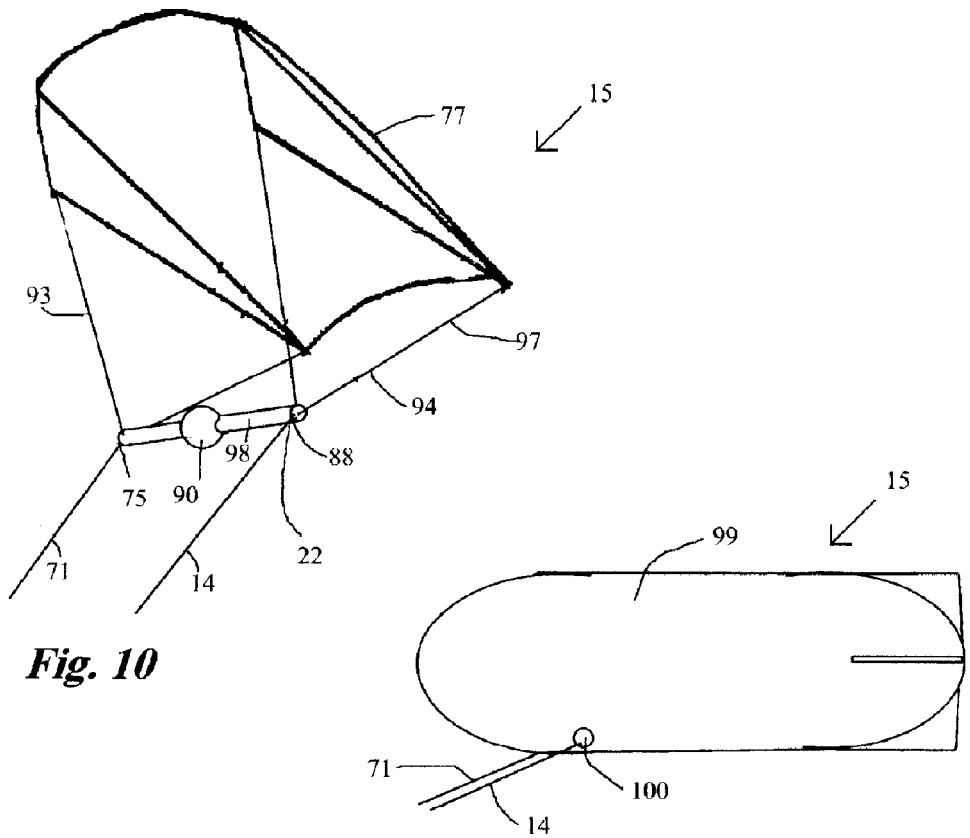
*Fig. 10*
*Fig. 11*
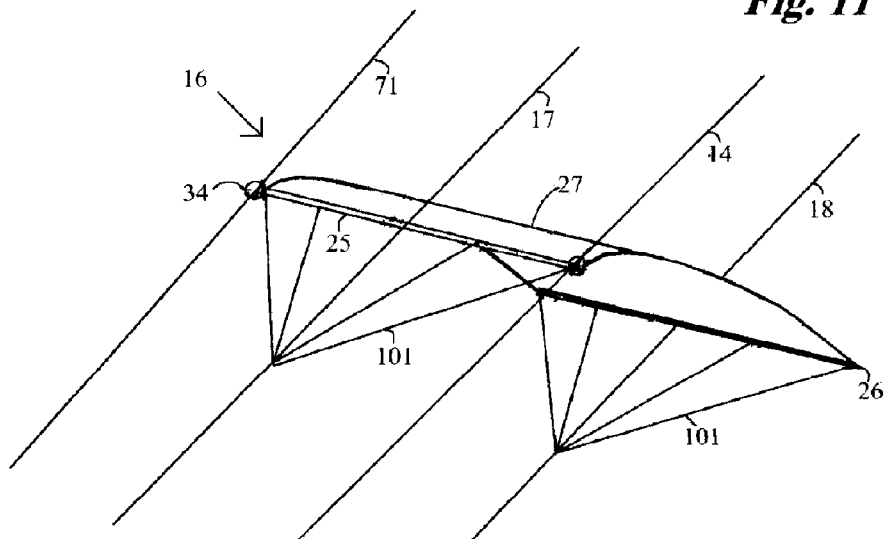
*Fig. 12*

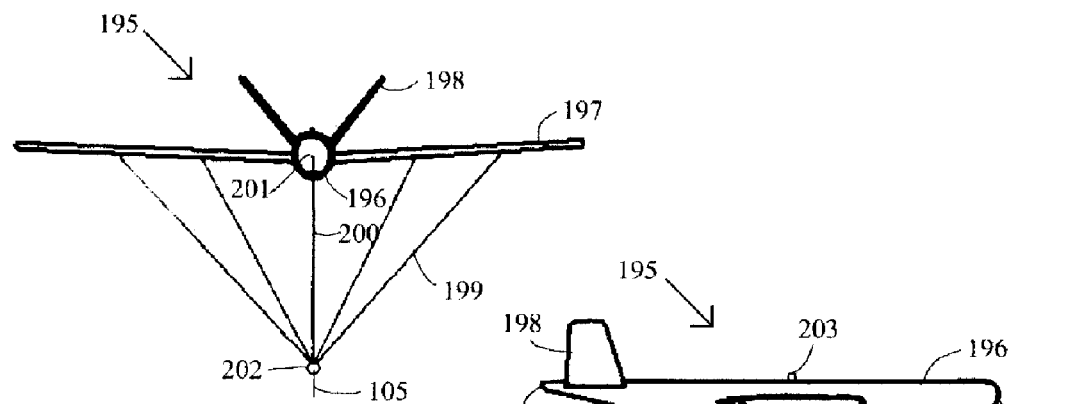
Fig. 25
Fig. 26
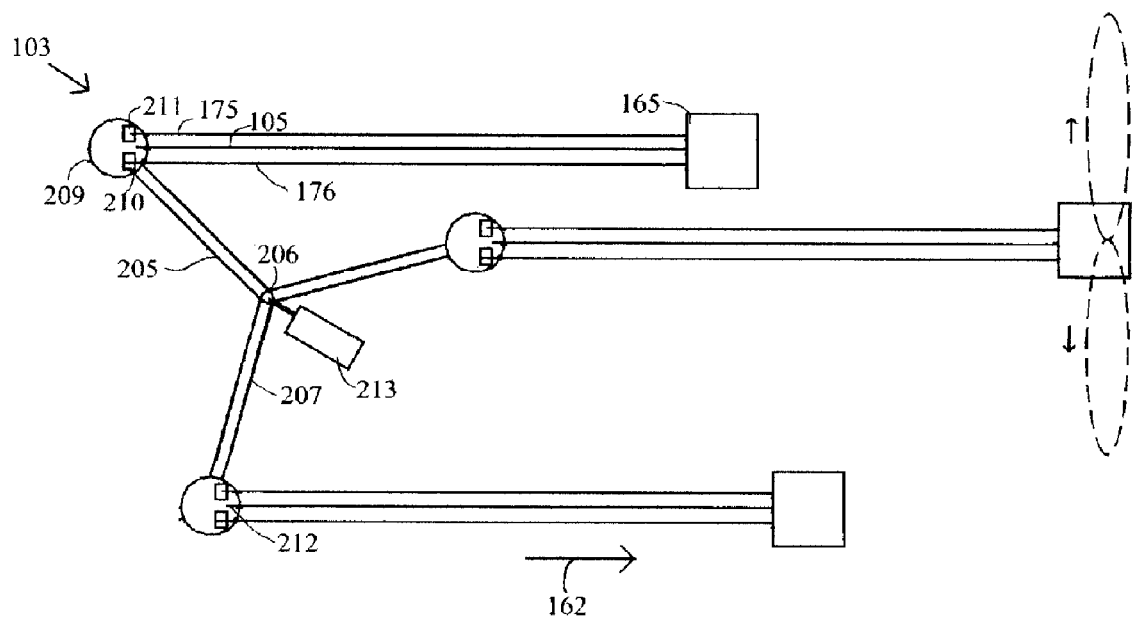
Fig. 27

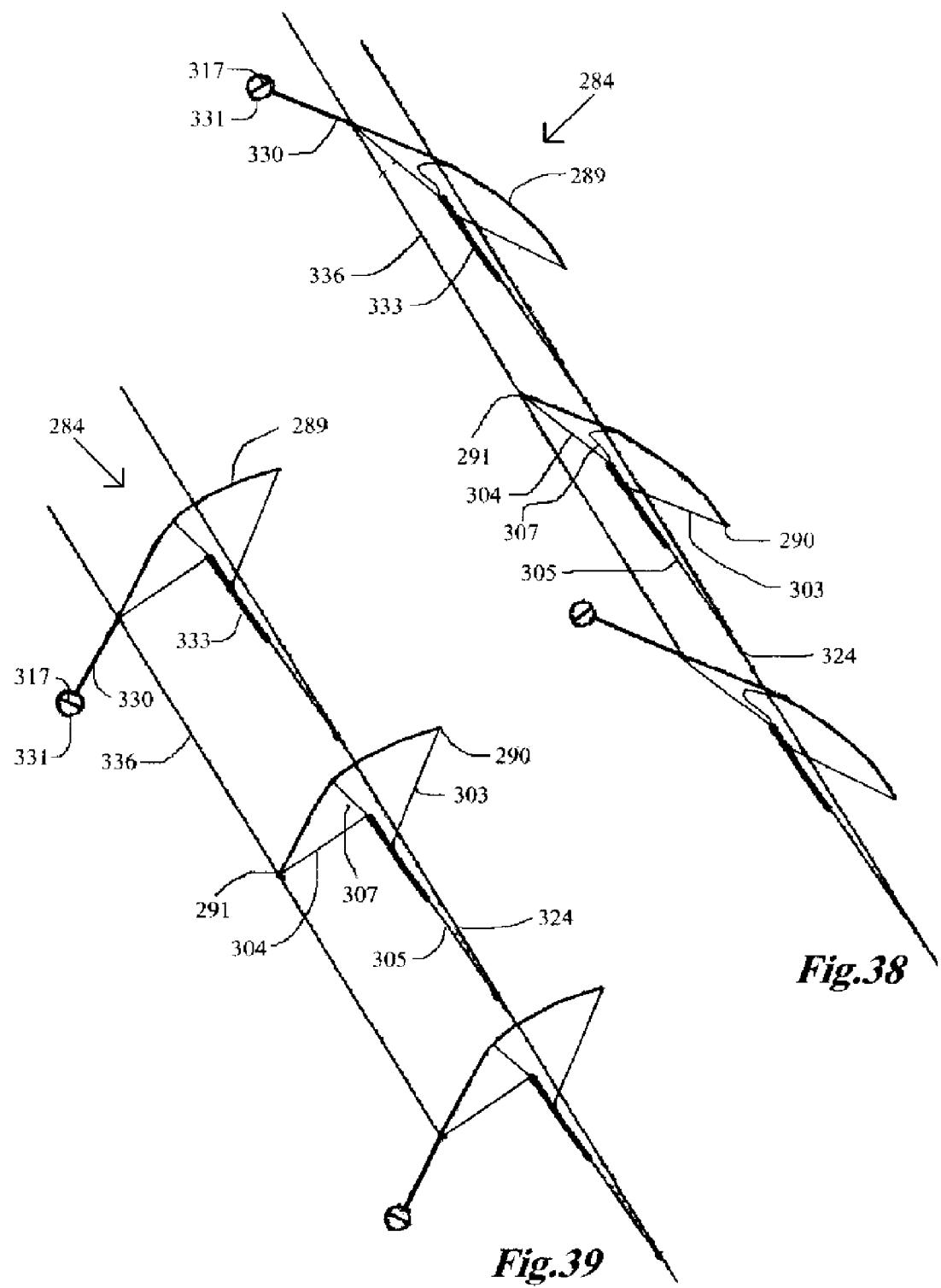

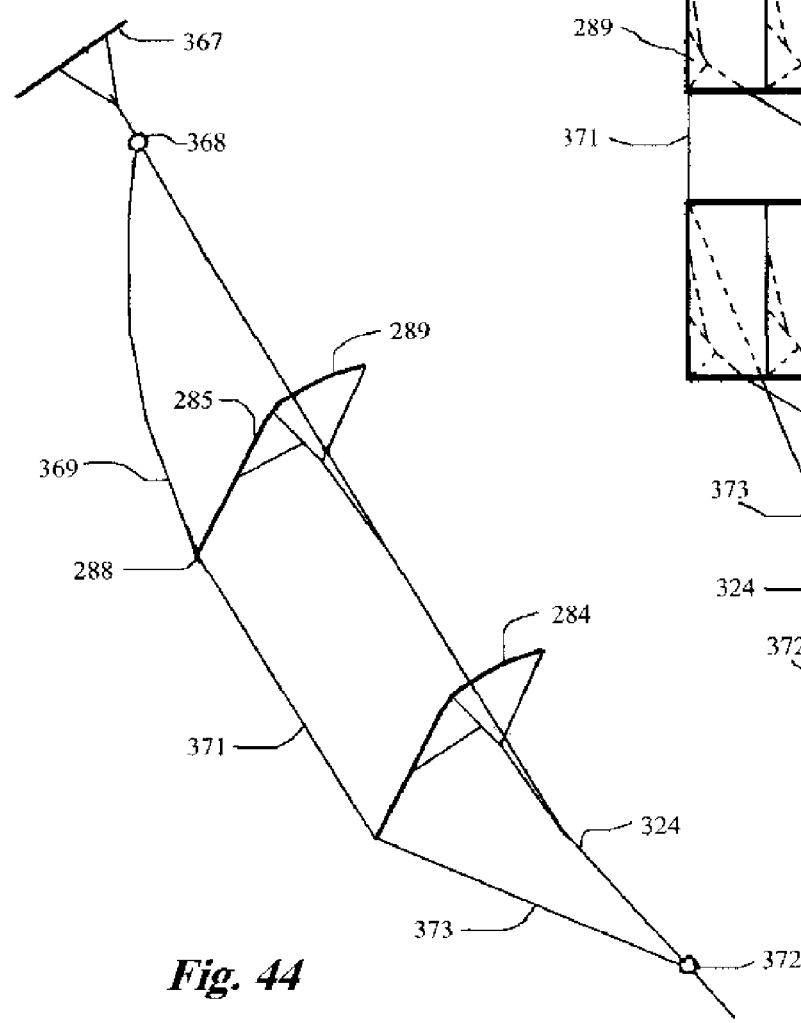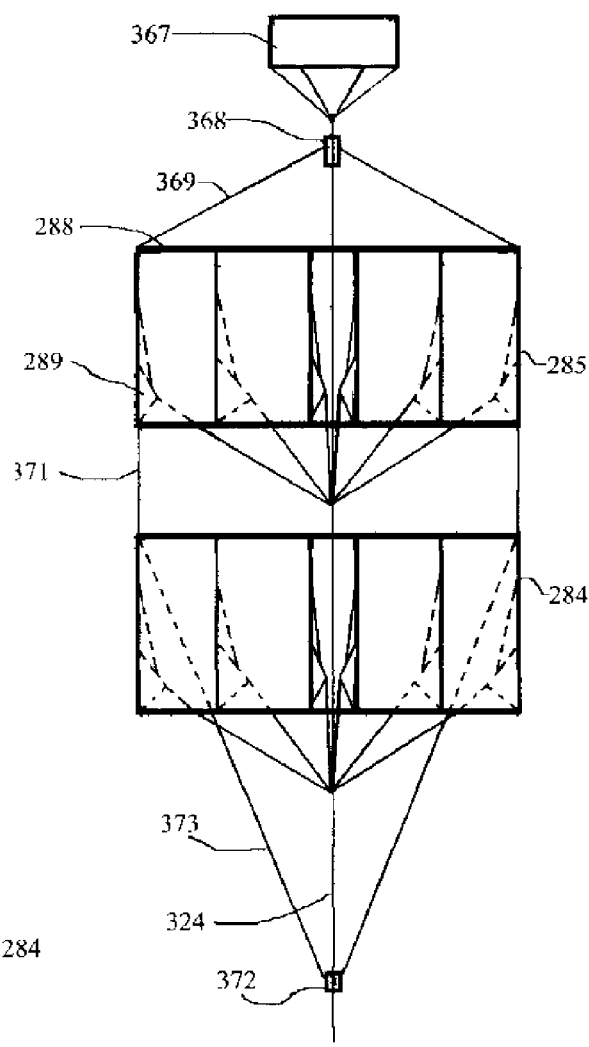
*Fig. 43*
*Fig. 44*

WIND DRIVE APPARATUS FOR AN AERIAL WIND POWER GENERATION SYSTEM

This application is a continuation-in-part of Ser. No. 11/307,890 filed Feb. 27, 2006, now U.S. Pat. No. 7,188,808, which is a continuation-in-part of Ser. No. 11/164,512 filed Nov. 28, 2005.

TECHNICAL FIELD

The present invention relates to power generation and more particularly to systems and methods that convert wind energy acting on aerial wind driven elements to rotary or electrical power.

BACKGROUND ART

As fossil fuels become depleted and more expensive, the need for cost competitive methods and apparatus for harnessing renewable energy sources increases. The wind was long used for powering sailing ships and windmills, but the advent of steam engines or turbines, internal combustion engines, and gas turbines provided cheaper, more convenient energy sources. Less expensive and more efficient apparatus and methods for utilizing wind power would now be beneficial.

Windmills (or wind turbines) are currently being used to generate electricity and to drive pumps, however the cost to generate electricity with a windmill is still more expensive than the cost of electricity generated from some fossil fuels. Windmills have a high capital cost relative to power generated. Wind speed, in general, is higher and more consistent with increasing altitude. There is potential to generate significant power with airborne or aerial apparatus at altitudes above the heights reasonably reachable by ground-based windmills.

The challenge with wind power generation is to convert the linear power of the wind to rotary motion to drive an electrical generator or a pump. One known approach to aerial wind power generation is a tethered, aerial windmill. Such aerial windmills can be supported by lighter than air aircraft, such as a blimp, or by lift from airfoil wing structures. These aerial windmills are relatively heavy and require long, heavy electrical cables to transmit the generated power to ground level.

A second known approach to aerial wind power generation is a wind powered element, such as a kite, blimp or airfoil, that is connected to a tow line. The tow line wraps around a reel on the shaft of a ground level power generation device. As the wind powered element is pulled by the wind, the distance from the wind powered element to the shaft increases and the tow line rotates the reel and shaft to generate power. The angle of attack or the shape of the wind powered element is changeable so that the wind powered element can be reeled back towards the ground level power generation device with little power use.

A third known approach to aerial wind power generation is an endless chain of spaced kites linked to the shaft of a ground level power generation device. The kites follow an ascending path and a descending path. The kites are adjustable to provide higher lift while on the ascending path.

DISCLOSURE OF THE INVENTION

An aerial power generation system includes a guide line that extends skywards at a selected angle. The guide line is connected at the upper end to a support body. A wind driven apparatus with a driven element is slidably mounted on the guide line. The driven element uses a sail-like design with curvature about a horizontal axis so as to maximize the lift and drag wind forces, or the driven element includes a rotatable hub with a plurality of airfoil blades. The driven element is connected by a tow line to a reel on a shaft of a means for generating power. Means are provided for changing the driven element from high force configurations to low force configurations. The camber of the airfoil driven element is controlled to maximize the force when the driven element is in a high force configuration and to minimize the force when the drive element is in a low force configuration.

Another aerial power generation system includes a plurality of wind driven apparatus with driven elements connected by tow lines to spaced attachment points on a revolving apparatus that drives a means for generating power. A means for changing the driven elements between high force configurations and low force configurations changes each driven element to high force configurations when the respective attachment point is moving downwind and to low force configurations when the respective attachment point is moving upwind to cause rotation of the revolving apparatus. The driven elements are flown in a pattern at a high speed perpendicular to the tow line, when in the high force configurations, to increase the power generated.

Another aerial power generation system includes a wind driven apparatus with an airfoil driven element and a means for adjusting the elevation and azimuth angles of the driven element connected through a swivel to a tow line that is connected to a means for generating power. A method of aerial power generation includes flying the driven element at high speed perpendicular to the tow line in a selected pattern, such as a circle. Another aerial power generation system includes a wind driven apparatus with an airfoil driven element, means for adjusting the pitch angle, means for adjusting the azimuth angles of the driven element, and means for controlling the camber of the sail portion of the driven element.

BRIEF DESCRIPTION OF THE DRAWINGS

Details of this invention are described in connection with the accompanying drawings that bear similar reference numerals in which:

FIG. 1 is a perspective view of an aerial wind power generation system embodying features of the present invention.

FIG. 2 is a front elevation view of a driven element of the system of FIG. 1.

FIG. 10 is a perspective view of another support body for the system of FIG. 8.

FIG. 11 is a side elevation view of another support body for the system of FIG. 8.

FIG. 12 is a perspective view of a driven element for the system of FIG. 8.

FIG. 25 is a front view of another driven element for the revolving apparatus of FIG. 13.

FIG. 26 is a side view of the driven element of FIG. 25.

FIG. 27 is a top plan view of another revolving apparatus of the system of FIG. 13.

FIG. 38 is a side elevation view of a train of the wind driven apparatus of FIG. 37 in a low force configuration.

FIG. 39 is a side elevation view of a train of the wind driven apparatus of FIG. 37 in a high force configuration.

FIG. 43 is a top plan view of a train of the wind driven apparatus of FIG. 34 without airfoils.

FIG. 44 is a side elevation view of the train of the wind driven apparatus of FIG. 43 in a high force configuration.

DETAILED DESCRIPTION OF THE INVENTION

Figure 3:
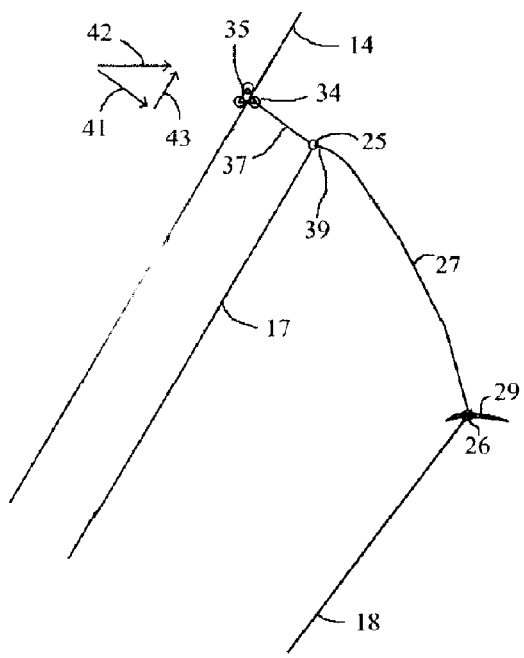
FIG. 3 is a side elevation view of a driven element of the system of FIG. 1, in a high force configuration.

Referring now to FIG. 1, an aerial wind power generation system 11 embodying features of the present invention includes a first guide line 14, a first support body 15, a driven element 16, a first tow line 17, a second tow line 18 and a means for generating power 19. The first guide line 14 has a first end 21 that is tethered at the ground or to a structure, and the first guide line 14 extends skywardly at a selected elevation angle to a spaced second end 22 that is attached to the first support body 15. The first support body 15 is an aircraft that is lifted by the wind, such as a kite as shown, or a lighter than air aircraft, such as a blimp or a balloon. Preferably the lift of the first support body 15 can be varied to maintain the elevation angle of the first guide line 14.

The driven element 16 is slidably attached or mounted on the first guide line 14. The driven element 16 is a kite, sail, airfoil or other element that generates both drag and lift from the wind. The first and second tow lines 17 and 18 each connect at one end to the driven element 16. The first tow line 17, and generally the second tow line 18, connect to the means for generating power 19 to rotate the means for generating power 19 to generate power. The means for generating power 19 is generally positioned near the first end 21 of the first guide line 14, and can be an electrical generator, a rotary pump, a compressor or other rotary power generation equipment.

Figure 4:
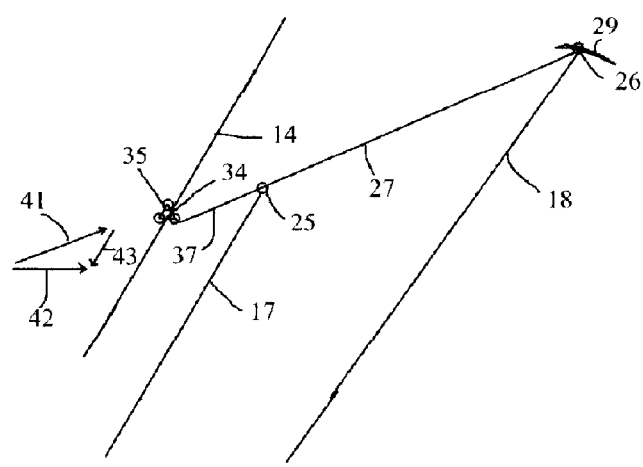
FIG. 4 is a side elevation view of a driven element of the system of FIG. 1, in a low force configuration.

FIGS. 2, 3 and 4 show a driven element 16 including an upper spar 25, a spaced, substantially parallel lower spar 26, and a generally rectangular, flexible fabric sail portion 27 extending between the upper and lower spars 25 and 26. The sail portion 27 includes a plurality of spaced, flexible, longitudinal spars or battens 28 transverse to the upper and lower spars 25 and 26. The battens 28 are shaped to curve the sail portion 27 into an airfoil shape with greater curvature near the upper spar 25 than near the lower spar 26 to provide increased lift force when needed. The battens 28 can be shaped to provide such curvature by tapering the upper ends 31 relative to the lower ends 32 to make the upper ends 31 more flexible, as in some sailboat or iceboat sails. Airfoils 29 can be provided if needed to enhance the stability and minimize drag when the driven element 16 is moving upwind. An airfoil 29 is shown attached to each end of the lower spar 26 and projects laterally therefrom to further control the shape of the driven element 16. The rotation angle of the airfoils 29 about a horizontal axis can be remotely controlled. The pair of airfoils 29 could also be used along the bottom edge of the sail and would thus be similar to conventional aircraft ailerons.

A pulley block 34 having three pulleys 35 in a triangular arrangement is slidably mounted onto the first guide line 14, with two pulleys 35 above and one pulley 35 below the first guide line 14. A plurality of support lines 37 attach to the pulley block 34, and diverge outwardly and downwardly therefrom to attach in a spaced arrangement along the upper spar 25 of the driven element 16. The first tow line 17 attaches to the upper spar 25 and the second tow line 18 attaches to the lower spar 26. Although a single driven element 16 is shown, a train or string of driven elements 16 can be used.

FIG. 3 shows the driven element 16 in a high force configuration. The wind acting on the driven element 16 is represented by an apparent wind vector 41. The apparent wind vector 41 is equal to the true wind vector 42 minus the driven element velocity vector 43. The first and second tow lines 17 and 18 are tensioned to bow the sail portion 27 into an airfoil shape and to position the sail portion 27 such that the leading edge 39 of the sail portion 27 points into the apparent wind vector 41. FIG. 4 shows the driven element 16 in a low force configuration. The second tow line 18 is lengthened relative to the first tow line 17, allowing the sail portion 27 to flatten and point into the apparent wind vector 41. The second tow line 18 acts as a control line.

Figure 5:
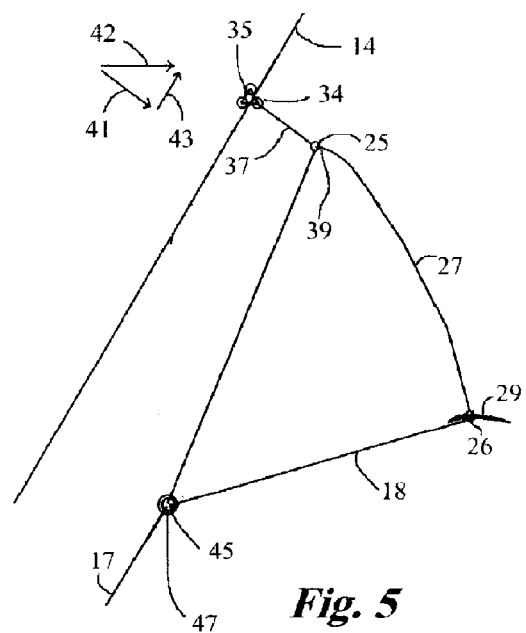
FIG. 5 is a side elevation view of a driven element of the system of FIG. 1, with an alternative control line arrangement.

In FIG. 1 the second tow line 18 extends to the means for generating power 19, and in combination with the means for generating power 19 forms a means for changing 45 the driven element 16 between high force and low force configurations. FIG. 5 shows an alternative means for changing 45 the driven element 16 between high force and low force configurations, with the second tow line 18 extending from the lower spar 26 of the driven element 16 to a remote control winch 47 that is mounted on the first tow line 17 and spaced from the upper spar 25 of the driven element 16. The winch 47 can include, by way of example and not as a limitation, a wind or solar powered electrical generator, batteries and a communications device for remote control. The winch 47 lengthens and shortens the second tow line 18. The winch 47 can be used in applications where the weight of the winch 47 is less than the weight of a second tow line 18 extending from the driven element 16 to the means for generating power 19.

Figure 6:
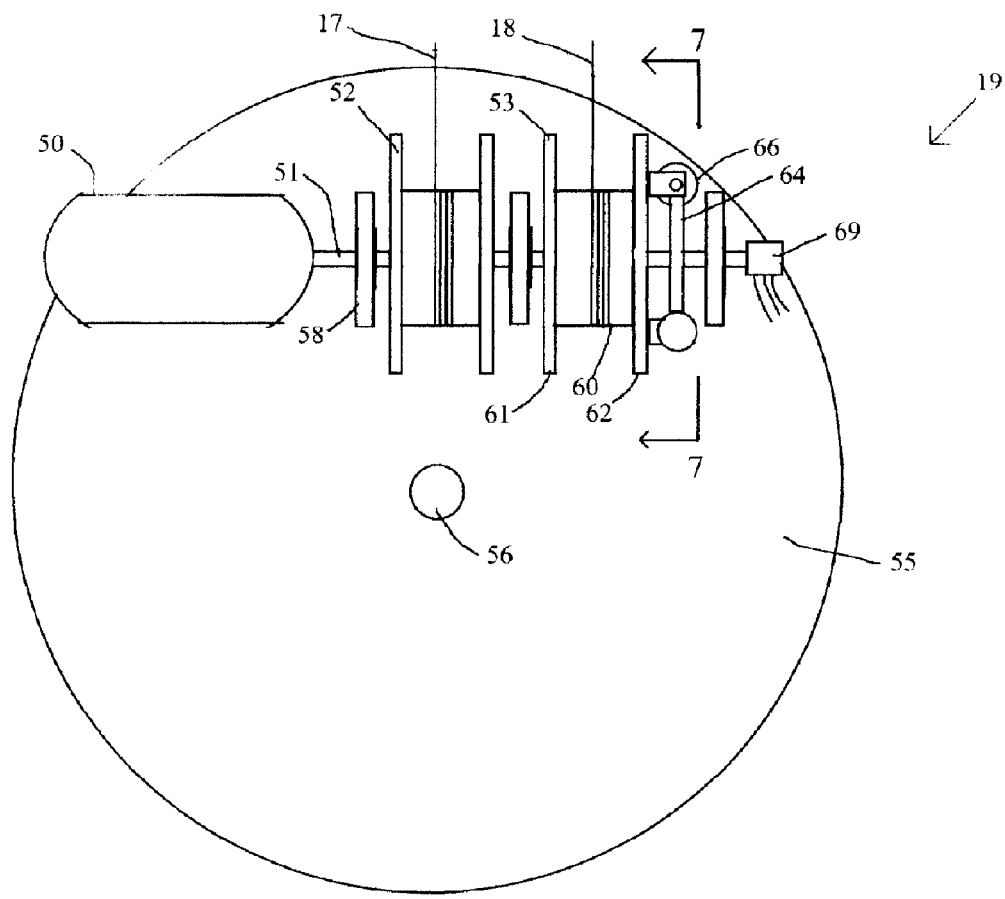
FIG. 6 is a top plan view of a means for generating power of the system of FIG. 1.
Figure 7:
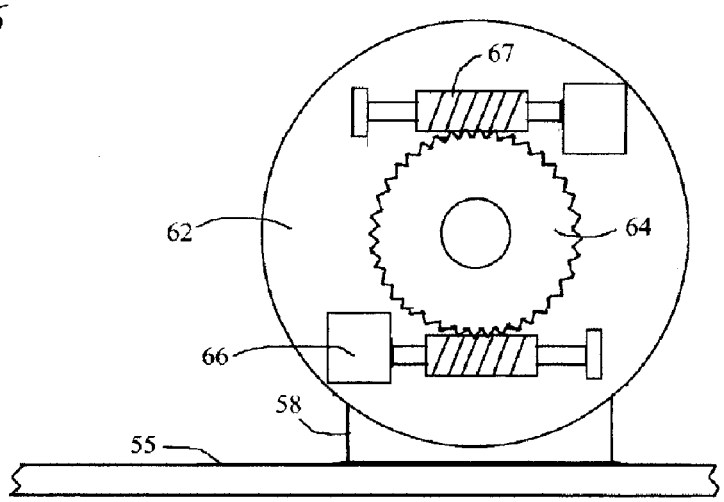
FIG. 7 is a sectional view taken along line 7-7 of FIG. 6.

Referring to FIGS. 6 and 7, the means for generating power 19 includes an electrical motor/generator 50 with a shaft 51 extending from one end, and spaced first and second reels 52 and 53 on the shaft 51. Preferably the means for generating power 19 is mounted on a rotating platform 55 that rotates about a pivot 56 to maintain the orientation of the power generation system 11 relative to the direction of the wind. The motor/generator 50 is rigidly mounted on the platform 55 with the shaft 51 being supported by spaced support bearings 58 that are also mounted on the platform 55. Three support bearings 58 are shown, with two support bearings 58 on the outer sides of the first and second reels 52 and 53, and one support bearing 58 between the first and second reels 52 and 53.

The first tow line 17 wraps around the first reel 52 and the second tow line 18 wraps around the second reel 53. The first reel 52 is rigidly attached to the shaft 51 and the second reel 53 is rotatably mounted on the shaft 51. The second reel 53 has cylindrical drum 60 mounted on the shaft 51 by bearings, and spaced first and second flanges 61 and 62 at opposite ends of the drum 60. A toothed gear 64 is rigidly attached to the shaft 51 and spaced from the second flange 62. Two control motors 66 are mounted on the outside of the second flange 62 on opposite sides of the shaft 51. A worm gear 67 is connected to and driven by each control motor 66, with the worm gears 67 being parallel and meshing to opposite sides of the toothed gear 64. Two motors are used to provide good mass balance of the reel assembly and thus allow for higher rotation rates. Slipring assemblies 69 on the end of shaft 51 opposite the motor/generator 50 and inside the drum 60 provide power to the control motors 66. Driving the control motors 66 rotates the second reel 53 relative to the first reel 52, lengthening or shortening the second tow line 18 relative to the first tow line 17, thereby providing a means for changing 45 the driven element 16 between high force and low force configurations. Therefore, the second reel 53, toothed gear 64, worm gears 67 and control motors 66 form a means for shortening and lengthening the second tow line 18 relative to the first tow line 17. Alternatively, the means for generating power 19 could include two independent, vertically stacked motor/generators to provide a means for changing 45 the driven element 16 between high force and low force configurations.

The first guide line 14 provides stability to the driven element 16, allowing the use of driven elements 16 with higher power and less stability than the driven elements 16 that could be used without the first guide line 14. The first guide line 14 also guides the driven element 16 along a path having a selected elevation angle, so that the power of the driven element 16 can be further optimized.

Figure 8:
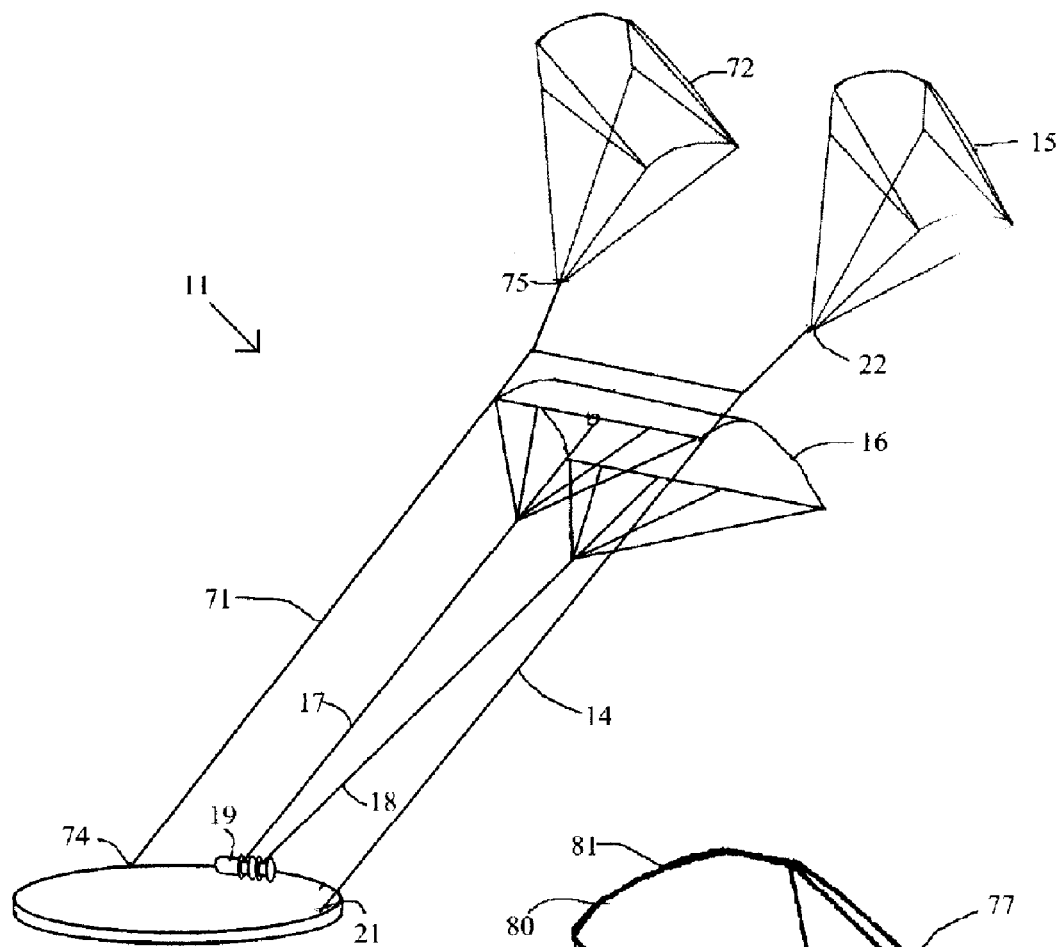
FIG. 8 is a perspective view of another aerial wind power generation system embodying features of the present invention, with two guide lines.

FIG. 8 shows an aerial wind power generation system 11 embodying features of the present invention including a first guide line 14, a second guide line 71, a first support body 15, a second support body 72, a driven element 16, a first tow line 17, a second tow line 18 and a means for generating power 19. The first guide line 14 has a first end 21 that is tethered at the ground or to a structure, and the first guide line 14 extends skywardly at a selected elevation angle to a spaced second end 22 that is attached to the first support body 15. The second guide line 71 has a first end 74 that is tethered at the ground or to a structure, and the second guide line 71 extends skywardly, spaced from and generally parallel to the first guide line 14, at a selected elevation angle to a spaced second end 75 that is attached to the second support body 72. The first and second support bodies 15 and 72 are each an aircraft that is lifted by the wind, such as a kite as shown, or a lighter than air aircraft, such as a blimp or a balloon. Preferably the lift and angle of attack of the first and second support bodies 15 and 72 can be varied to maintain an optimum elevation angle of the first and second guide lines 14 and 71.

Figure 9:
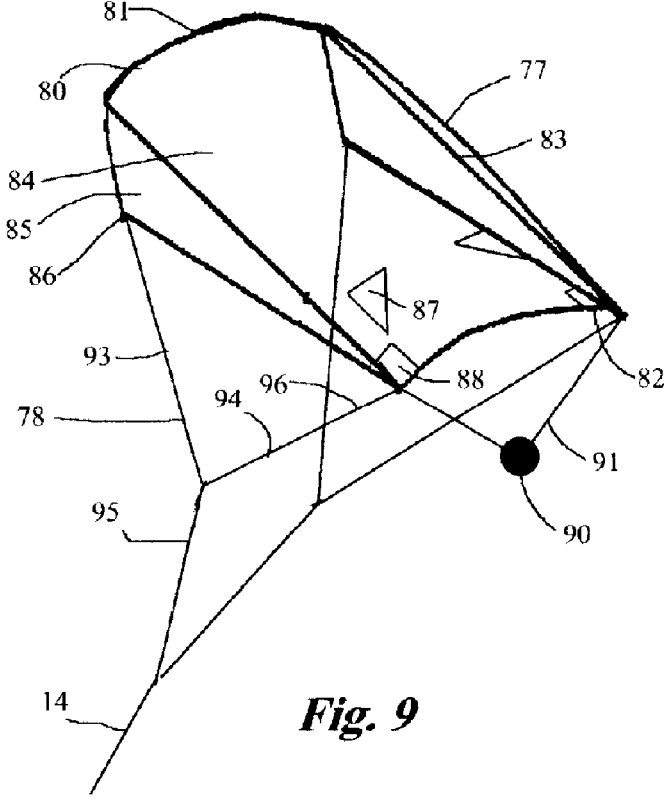
FIG. 9 is a perspective view of a support body of FIG. 8.

Referring to FIG. 9, the first support body 15 includes a kite 77 and a bridle 78. The kite 77 is generally a modified sled kite and has a substantially rectangular framework 80 with a top spar 81, a spaced bottom spar 82, and two spaced, parallel side spars 83 that extend from the top spar 81 to the bottom spar 82. A sail portion 84 covers the framework 80 and has equal triangular wings 85 extending laterally beyond the side spars 83. The outward corners 86 of the wings 85 are located significantly nearer to the top spar 81 than to the bottom spar 82. A pair of spaced, triangular holes 87 are located in the sail portion 84 near the bottom spar 82 to add stability to the kite 77.

A winch 88 is mounted in each lower corner of the framework 80. Wires 91 extend from each winch 88 to a control module 90, suspending the control module 90 below the bottom 82, intermediate the winches 88, and connecting the control module 90 to the two winches 88. The suspended control module 90 acts as a tail for the kite 77, increasing the stability of the kite 77. The control module 90 can include, by way of example, and not as a limitation, a two way radio link to the ground, a rechargeable battery, a wind or solar battery charging device, measurement devices and aircraft warning lighting. The measurement devices can include wind speed, light, altitude, GPS, three dimensional acceleration, temperature, humidity, and orientation sensing and measurement.

The bridle 78 includes two each upper bridle lines 93, lower bridle lines 94 and common bridle lines 95. One end of each upper bridle line 93 connects to an outward corner 86 of a wing 85 of the sail portion 84. One end of each lower bridle line 94 connects to a winch 88. The other ends of the upper and lower bridle lines 93 and 94 on each side of the kite 77 connect together and to one end of a common bridle line 95. The other ends of the common bridle lines 95 connect together and to the second end 22 of the first guide line 14. The lower bridle lines 94 in combination with the winches 88 can vary the angle of attack of the kite 77 relative to the wind, thereby forming a means for varying lift 96 (or drag) of the kite 77. Differential control of the lower bridle line lengths will allow for azimuth angle control with respect to the wind direction. Although first support body 15 is shown, second support body 72 will be substantially identical. Although a single kite 77 is shown, a train of kites 77 can be used to form the first or second support body 15 or 72.

FIG. 10 shows the kite 77 with a modified bridle 97 for providing support to both the first and second guide lines 14 and 71. One end of each upper bridle line 93 connects to an outward corner 86 of a wing 85 of the sail portion 84. One end of each lower bridle line 94 connects to an end of the bottom spar 82 of the framework 80 of the kite 77. A tube 98, sized to extend between the first and second guide lines 14 and 71, has the control module 90 incorporated into the middle and the winches 88 incorporated into opposite ends. The other ends of the upper bridle lines 93 connect to opposite ends of the tube 98. The other ends of each of the lower bridle lines 94 connects to a winch 88. The second end 22 of the first guide line 14 connects to one end of the tube 98 and the second end 75 of the second guide line 71 connects to the opposite end of the tube 98. The winches 88 shorten or lengthen the lower bridle lines 94 to vary the angle of attack of the kite 77 relative to the wind.

As shown in FIG. 11, the first support body 15 can be a blimp 99 with a transverse support bar 100. The second end 22 of the first guide line 14 connects to one end of the support bar 100 and the second end 75 of the second guide line 71 connects to the opposite end of the support bar 100. The use of the blimp 99 eliminates the need to bring the aerial portions of the power generation system 11 to the ground during low wind conditions and may allow for larger scale systems with higher power generation.

FIG. 12 shows the driven element 16 with pulley blocks 34 at opposite ends of the upper spar 25 to slidably mount the driven element 16 on the spaced first and second guide lines 14 and 71. A plurality of bridle lines 101 attach at one end in a spaced arrangement to the upper spar 25 and converge to attach to the first tow line 17. A plurality of bridle lines 101 attach at one end in a spaced arrangement to the lower spar 26 and converge to attach to the second tow line 18. The first and second tow lines 17 and 18 are shown extending beyond the driven element 16 and may attach to additional driven elements 16 that are above and downwind from the shown driven element 16.

Figure 13:
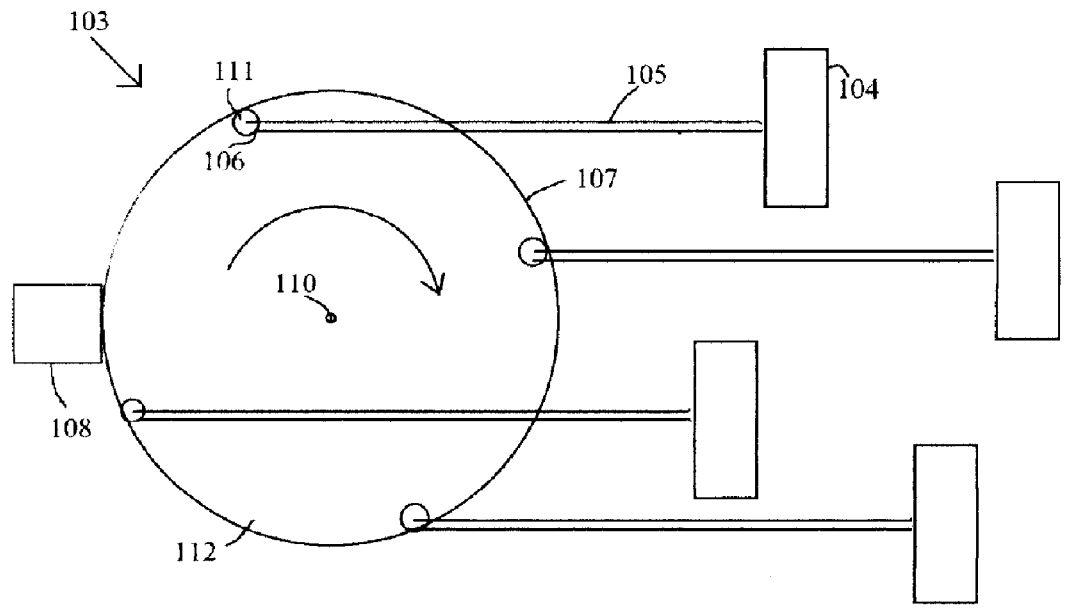
FIG. 13 is a top schematic view of another aerial wind power generation system embodying features of the present invention.

Referring to FIG. 13, an aerial wind power generation system 103 embodying features of the present invention includes a plurality of aerial wind powered driven elements 104, a tow line 105 for each of the driven elements 104, a means for changing 106 each of the driven elements 104 individually between high force and low force configurations, a revolving apparatus 107, and a means for generating power 108. The revolving apparatus 107 has a center 110 and, for each driven element 104, a tow line attachment point 111. The revolving apparatus 107 is represented by circle 112 and the tow line attachment points 111 are evenly spaced around the periphery of the revolving apparatus 107. One end of each tow line 105 connects to a driven element 104 and the other end of each tow line 105 connects to a tow line attachment point 111. The means for generating power 108 is linked to and driven by the revolving apparatus 107.

The means for generating power 108 can be directly connected or can be linked by gears, belts, driveshafts or other means, and might be located near the center 110 and driven by a rotating shaft below the revolving apparatus 107.

Figure 14:
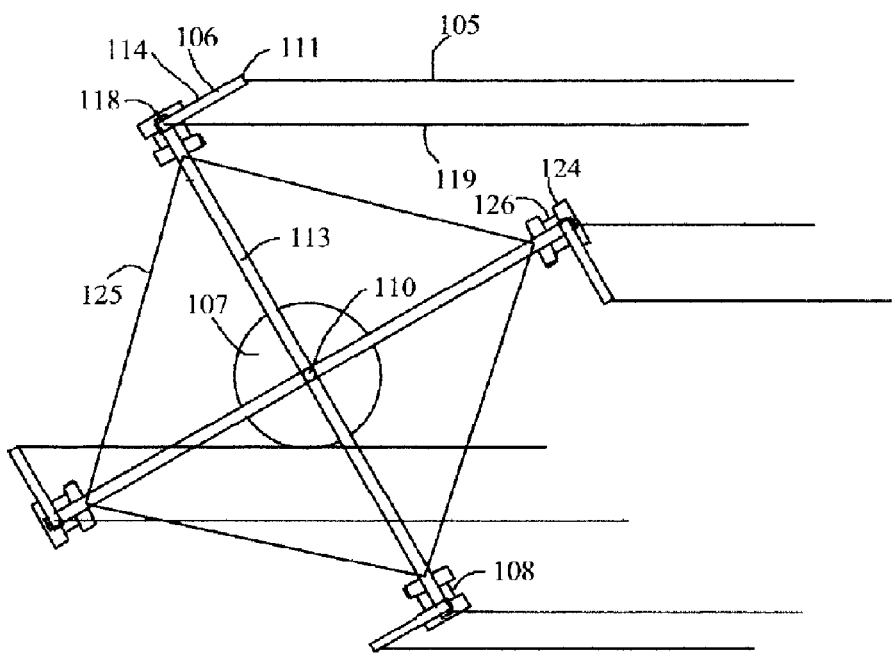
FIG. 14 is a top plan view of a revolving apparatus of the system of FIG. 13.
Figure 15:
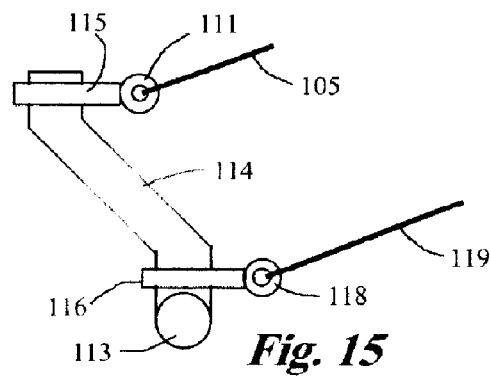
FIG. 15 is a partial side elevation view of the revolving apparatus of the system of FIG. 14.

FIGS. 14 and 15 show a revolving apparatus 107 with four cross bars 113 projecting horizontally from the center 110, and spaced ninety degrees from each other. At the end of each cross bar 113, opposite the center 110, an upright member 114 projects upwardly and transversely. An upper rotating collar 115 rotates around the upper end of each upright member 114 and a lower rotating collar 116 rotates around the lower end of each upright member 114. The upper rotating collar 115 provides the tow line attachment point 111. The lower rotating collar 116 provides a control line attachment point 118 for one end of a control line 119. The opposite end of the control line 119 connects to the driven element 104.

Figure 16:
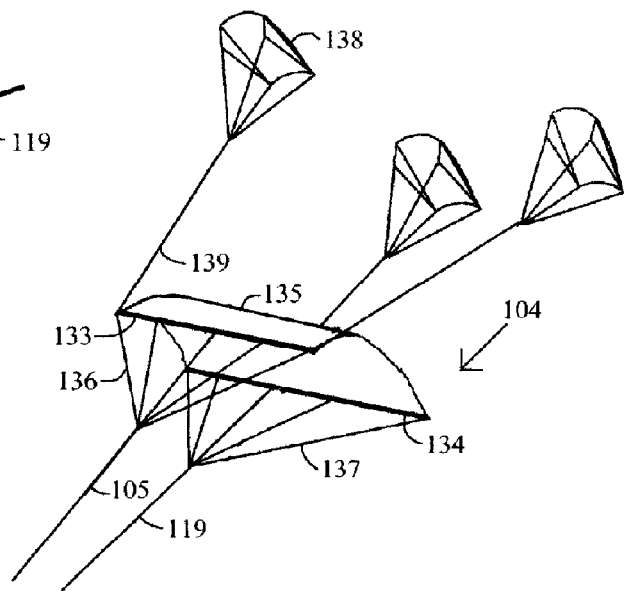
FIG. 16 is a perspective view of a driven element of the system of FIG. 13.

As shown in FIG. 16, a driven element 104 includes an upper spar 133, a lower spar 134 spaced from the upper spar 133, and a rectangular sail portion 135 extending between the upper and lower spars 133 and 134. A plurality of upper bridle lines 136 connect in a spaced arrangement to the upper spar 133 and converge to connect to the tow line 105. A plurality of lower bridle lines 137 connect in a spaced arrangement to the lower spar 134 and converge to connect to the control line 119. Three sled kites 138 are connected to the driven element 104 by support lines 139, to increase stability and support, with a kite 138 connecting to each end of the upper spar 133 and one kite 138 connecting to the middle of the lower spar 134. The angle of attack of the driven element 104 relative to the wind changes as the tow line 105 and control line 119 are pulled in or let out relative to each other, changing the driven element between high force and low force configurations. A similar change in the angle of attack of the kites 138, as described above, might also be used in synchronization with the changes in the driven element 104. The driven element 104 can also be an inline train of sled kites 138. The sled kites 138 can be radio controlled or controlled by multiple lines to the ground.

Referring to FIG. 14, when a cross bar 113 is moving directly downwind, the respective upright member 114 projects downwind. At this position the end of the cross bar 113 has the longest distance, relative to other points of rotation of the revolving apparatus 107, to the attachment of the tow line 105 to the upper bridle lines 136. The lengths of the tow line 105 and control line 119 are tailored so that the driven element 104 is in the highest force configuration when the end of the cross bar 113 is moving directly downwind. The cross bar 113 moving directly upwind has the shortest distance, relative to other points of rotation of the revolving apparatus 107, from the end of the cross bar 113 to the attachment of the tow line 105 to the upper bridle lines 136 and this is the position of the lowest force configuration. The upright member 114 and control line 119 provide the means for changing 106. The driven elements 104 are pulled downwind by the wind in high force configurations and upwind by the revolving apparatus 107 in low force configurations, causing the revolving apparatus 107 to revolve and to drive the means for generating power 108.

The means for changing 106 can be a remote control system as described above or other mechanical means for lengthening and shortening the tow line 105 and control line 119 relative to each other. The means for generating power 108 can be an electrical generator, a liquid pump, a compressor or other power transfer device. The power generation system 103 can be scaled from smaller to larger sizes.

For smaller sizes of the power generation system 103, the cross bars 113 of the revolving apparatus 107 can be self supporting. Larger versions of the power generation system 103 could have the revolving apparatus 107 as large as a revolving agricultural irrigation system. The cross bars 113 of a large revolving apparatus 107 can be supported by wheels 124 and linked by cables 125. The wheels 124 can carry and drive a generator 126.

Figure 17:
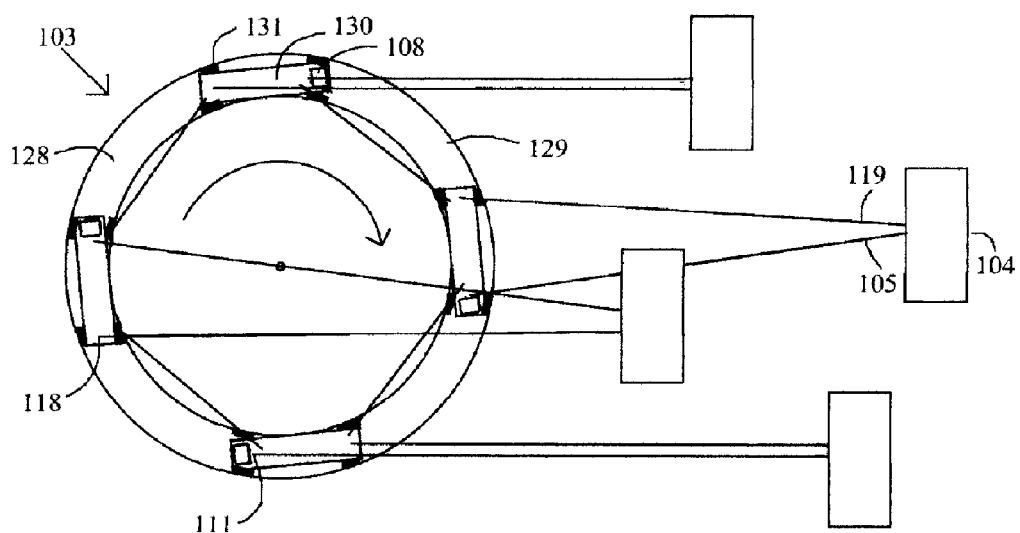
FIG. 17 is a top plan view of another revolving apparatus of the system of FIG. 13.

FIG. 17 shows an aerial wind power generation system 103 with another revolving apparatus 128 having an endless, closed track 129 with a plurality of spaced, linked cars 130 on the track. The track 129 can be a railroad type track and the cars 130 can be similar to railroad cars. The track 129 does not have to have a circular shape and can be shaped to optimize power generation. Generally, the means for generating power 108 is carried on the cars 130 and connected to wheels 131 to generate power. The tow line 105 attaches forwardly on the car 130 and the control line 119 attaches rearwardly on the car 130, to change the driven element between high force and low force configurations as the cars 130 travel around the track. The aerial wind power generation system 103 could alternatively have a revolving apparatus with a plurality of towers with bullwheels similar to ski chairlifts and aerial trams. A cable could pass around the bullwheels in a generally circular path with tow lines 105 and control lines 119 attaching to the cable.

Figure 18:
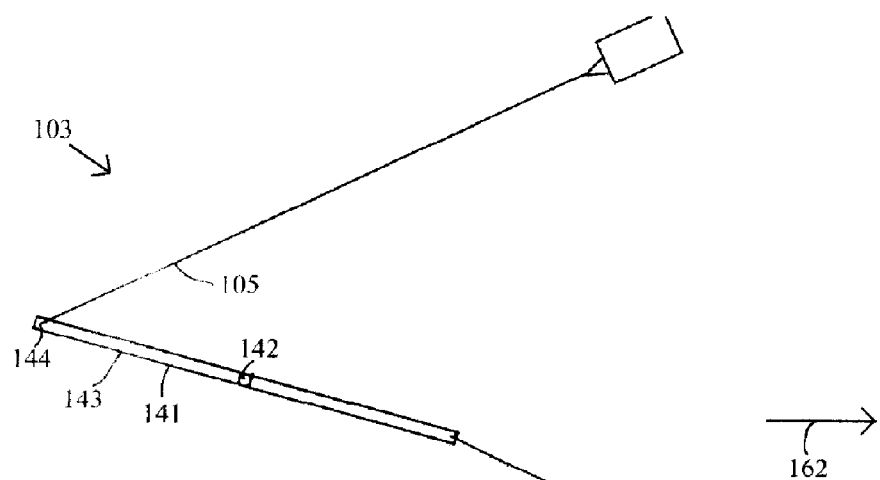
FIG. 18 is a top plan view of another revolving apparatus of the system of FIG. 13.
Figure 19:
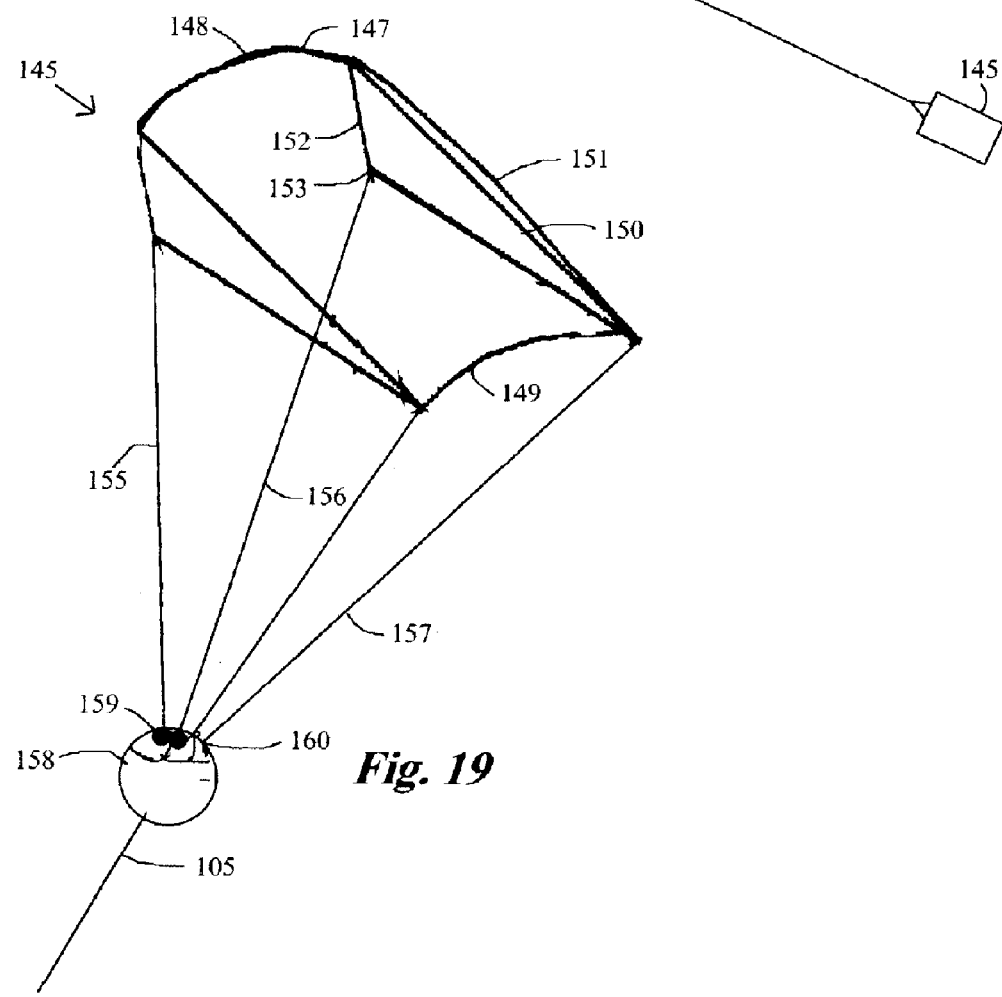
FIG. 19 is a perspective view of a driven element for the revolving apparatus of FIG. 13.

FIG. 18 shows an aerial wind power generation system 103 with another revolving apparatus 141 having a center 142 with a pair of cross bars 143 projecting horizontally in opposite directions from the center 142. A tow line attachment point 144 is provided at the end of each cross bar 143, opposite the center 142. A tow line 105 connects a driven element 145 to each tow line attachment point 144. Referring to FIG. 19, the driven element 145 shown is a modified sled kite and has a substantially rectangular framework 147 with a top spar 148, a spaced bottom spar 149, and two spaced, parallel side spars 150 that extend from the top spar 148 to the bottom spar 149. A sail portion 151 covers the framework 147 and has equal triangular wings 152 extending laterally beyond the side spars 150. The outward corners 153 of the wings 152 are located significantly nearer to the top spar 148 than to the bottom spar 149.

A bridle 155 for the driven element 145 includes two upper bridle lines 156 and two lower bridle lines 157. The upper bridle lines 156 connect at one end to corners 153, and the lower bridle lines 157 connect at one end to opposite ends of the bottom spar 149. A generally spherical control module 158 incorporates four winches 159 with the opposite ends of the upper and lower bridle lines 156 and 157 each connecting to a separate winch 159. The control module 158 connects to the upper end of a tow line 105. The control module 158 is remotely controlled and can change the length of each of the upper and lower bridle lines 156 and 157 independently. The control module 158 and the upper and lower bridle lines 156 and 157 provide a means for changing 106 the driven element 145 between high force and low force configurations, and a means for adjusting 160 the azimuth angle of the driven element 145.

Figure 20:
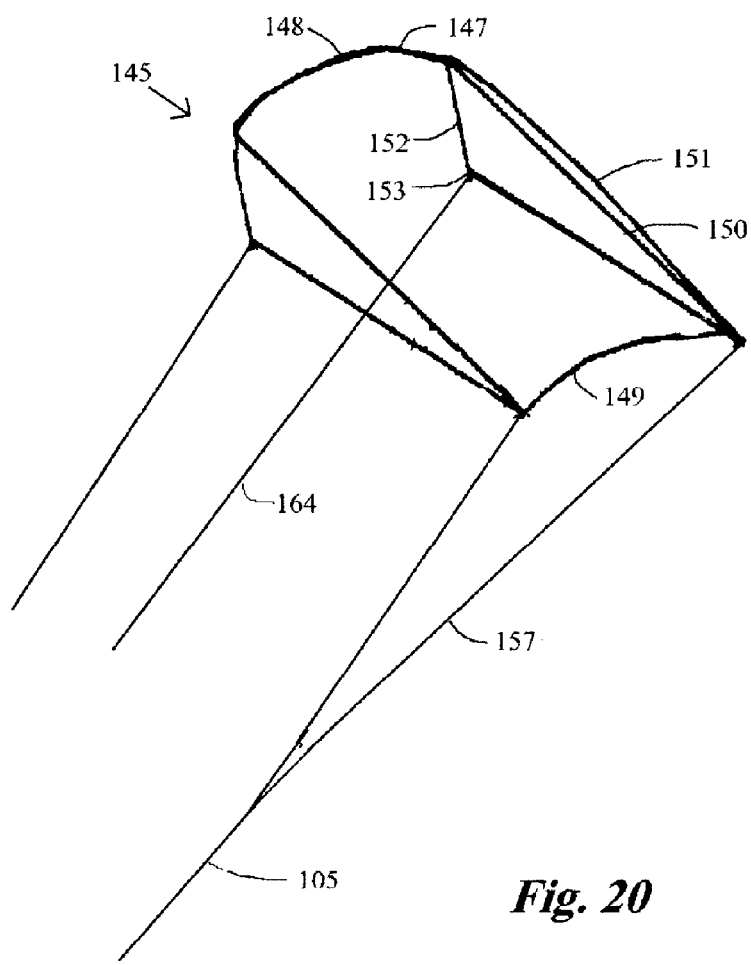
FIG. 20 is a perspective view of the driven element of FIG. 19 with a modified line configuration.

FIG. 20 shows an alternative configuration for driven element 145 with the two lower bridle lines 157 connecting to the tow line 105. Two spaced upper control lines 164 replace the two upper bridle lines 156, each connecting from a corner 153 of a wing 152 of the sail portion 151 to the end of the cross bar 143 that is opposite the center 142. The two upper control lines 164 are independently controlled so that the elevation and azimuth angles can be independently adjusted. This arrangement, with the lower bridle lines 157 connected to the tow line 105 and the two independently controlled upper control lines 164, provides another structure for the means for changing 106 the driven element 145 between high force and low force configurations, and another structure for the means for adjusting 160 the azimuth angle of the driven element 145.

Referring again to FIG. 18, the direction of the wind is shown by wind vector 162. By varying the azimuth angle of the driven elements 145, the driven elements 145 can fly at an angle relative to the wind vector 162. Each driven element 145 is changed to a high force configuration for a selected portion of the rotation of the respective tow line attachment point 144, where the selected portion is an arc of more than 180 degrees. The azimuth angle of the driven elements 145 is adjusted through this selected portion so that the driven elements 145, through the tow lines 105, each generate torque on the cross bars 143 throughout the selected portion. By generating torque for more than 180 degrees, the driven elements 145 generate more power than would be generated without a means for adjusting 160 the azimuth angle of the driven element 145.

Figure 21:
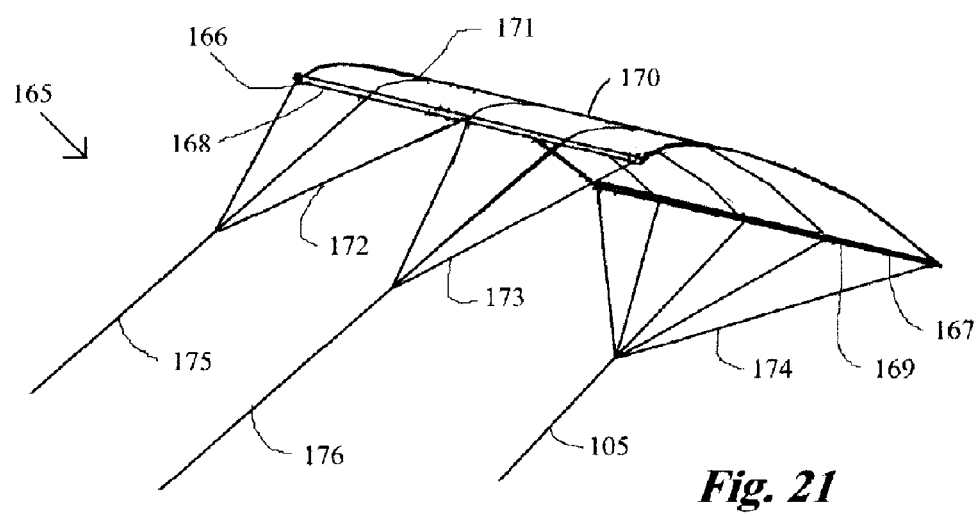
FIG. 21 is a perspective view of another driven element for the revolving apparatus of FIG. 13.

FIG. 21 shows another driven element 165 having a leading edge 166 and a trailing edge 167. The driven element 165 includes an upper spar 168 at the leading edge 166, a lower spar 169 at the trailing edge 167, spaced from the upper spar 168, and a rectangular sail portion 170 extending between the upper and lower spars 168 and 169. The sail portion 170 includes a plurality of spaced, flexible, longitudinal spars or battens 171 transverse to the upper and lower spars 168 and 169. The battens 171 are shaped to curve the sail portion 170 into an airfoil shape with greater curvature near the upper spar 168 than near the lower spar 169 to provide increased lift force when needed. A plurality of first upper bridle lines 172 connect in a spaced arrangement to one half of the upper spar 168 and a plurality of second upper bridle lines 173 connect in a spaced arrangement to the other half of the upper spar 168. A plurality of lower bridle lines 174 connect in a spaced arrangement to the lower spar 169.

The first upper bridle lines 172 converge to connect to a first upper control line 175 and the second upper bridle lines 173 converge to connect to a second upper control line 176. The lower bridle lines 174 converge to connect to the tow line 105. The first and second upper control lines 175 and 176, and the tow line 105 connect to the end of the cross bar 143 that is opposite the center 142. The first and second upper control lines 175 and 176 are independently controlled so that the elevation and azimuth angles can be independently adjusted. This arrangement, with the lower bridle lines 174 connected to the tow line 105 and the independently controlled first and second upper control lines 175 and 176, provides another structure for the means for changing 106 the driven element 165 between high force and low force configurations, and another structure for the means for adjusting 160 the azimuth angle of the driven element 165.

Figure 22:
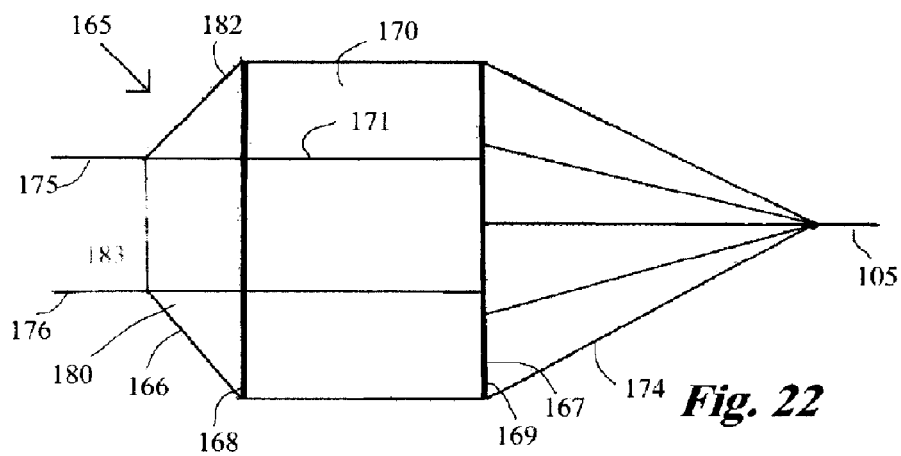
FIG. 22 is a top view of a variation of the driven element of FIG. 21.

FIG. 22 shows a variation of the driven element 165 where the first and second upper bridle lines 172 and 173 are replaced by an extension 180 of the sail portion 170, that forms the leading edge 166. The extension 180 extends from the upper spar 168 and has a trapezoidal shape with two spaced side edges 182 that slope inwardly from opposite ends of the upper spar 168 to a top edge 183 that is spaced from and parallel with the upper spar 168. The battens 171 extend into the extension 180 to the top edge 183. The first and second upper control lines 175 and 176 attach near opposite ends of the top edge 183.

Figure 23:
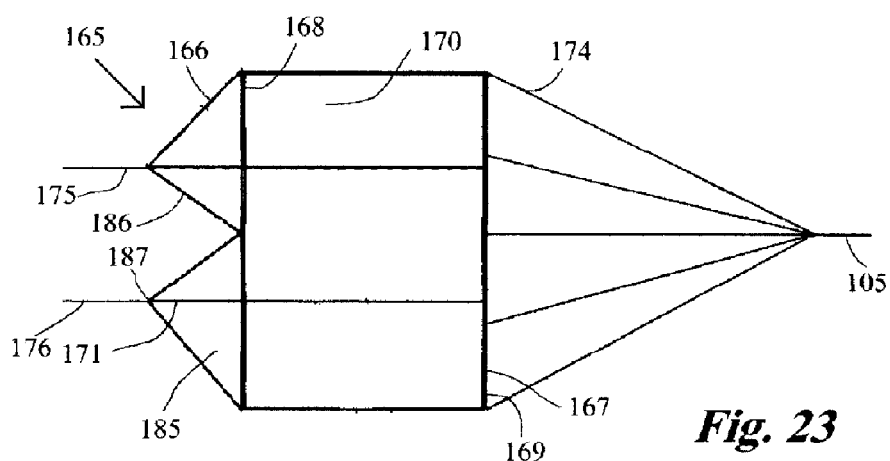
FIG. 23 is a top view of another variation of the driven element of FIG. 21.

FIG. 23 shows another variation of the driven element 165 where the first and second upper bridle lines 172 and 173 are replaced by a pair of triangular extensions 185 of the sail portion 170 that extend from the upper spar 168 and form the leading edge 166. The extensions 185 each have a pair of side edges 186 that slope inwardly from the upper spar 168 to converge at a corner 187. A batten 171 extends into each extension 185 to or near to the corner 187. The first and second upper control lines 175 and 176 each attach to a corner 187.

Figure 24:
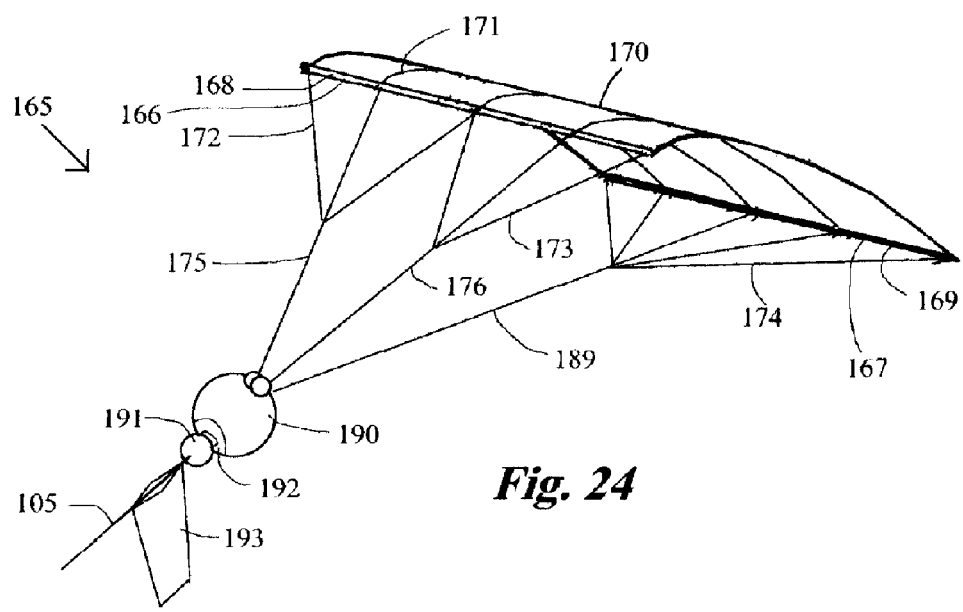
FIG. 24 is a perspective view of the driven element of FIG. 21 with a modified line configuration.

FIG. 24 shows another variation of the driven element 165 where the lower bridle lines 174 converge to connect to a lower control line 189. The first and second upper control lines 175 and 176, and the lower control line 189 all connect to a control module 190. The control module 190 connects to the tow line 105 through a swivel 191. The control module 190 includes winches or other means, connected to the first and second upper control lines 175 and 176, for controlling the first and second upper control lines 175 and 176 independently of each other. The swivel 191 allows the driven element 165 to rotate without twisting the tow line 105.

The control module 190 includes instrumentation such as listed above and a power supply such as a battery for powering the winches and the instrumentation. The control module 190 includes a wireless link for remote control and can also include sensors that measure the tension on the first and second upper control lines 175 and 176 and the lower control line 189. Ground instrumentation, including cameras can also be used to sense the precise position and orientation of the driven element 165. The swivel 191 can incorporate or include a small electrical generator 192, that is turned by rotation of the driven element 165 relative to the tow line 105, to provide power to the power supply. A stabilizer 193, in the form of a weight, as shown, or a fin, is suspended from the tow line 105 below the swivel 191, as a means for preventing the tow line from twisting when the driven element 165 rotates. Alternatively, two independently controlled lines can connect to the trailing edge 167 with at least one other line connecting to the leading edge 166.

FIGS. 25 and 26 show another driven element 195 that generally resembles a rigid wing aircraft. The driven element 195 has a small diameter, elongated fuselage 196 and a pair of laterally extending, rigid, airfoil shaped wings 197 on opposite sides of an intermediate portion of the fuselage 196. A spaced pair of control surfaces 198 extend upwardly and laterally outwardly from the tail 204 of fuselage 196. Alternatively, a conventional elevator and rudder configuration can be used at the tail 204 of the driven element 195. A plurality of laterally spaced bridle lines 199 attach to the underside of the wings 197 and fuselage 196.

A control line 200 extends from the nose 201 of the fuselage 196. A winch inside the fuselage 196 reels the control line 200 in and out. The interior of the fuselage also contains instrumentation such as set forth above. The bridle lines 199 and the control line 200 converge to connect to a swivel 202 that connects to the tow line 105. An attachment point 203 on the fuselage 196 above the wings 197 facilitates stacking of the driven elements 195. The control surfaces 198 and control line 200 provide means for adjusting the azimuth and elevation angles of the driven element 195. The control line 200 is a means for changing the driven element 195 between high force and low force configurations, and is reeled in until the fuselage 196 is substantially parallel to the tow line 105, to change the driven element 195 to a low force configuration.

FIG. 27 shows an aerial wind power generation system 103 with another revolving apparatus 205 having a center 206 with three equally spaced bars 207 projecting horizontally from the center 206. The revolving apparatus 205 is mounted to rotate about the center 206. A turntable 209 is rotatably mounted about a vertical axis at the end 210 of each bar 207. A pair of winches 211 mount on each turntable 209. The first and second upper control lines 175 and 176 each connect to a winch 211. The tow line 105 attaches at the tow line attachment point 212 on the turntable 209 downwind of the winches 211. A means for generating power 213 is linked to and driven by the revolving apparatus 205.

Winches 211 independently control the lengths of the first and second upper control lines 175 and 176, and thereby form a means for independently adjusting the elevation and azimuth angles of the driven element 165. Through adjustment of the elevation and azimuth angles, the direction of the lift of the driven element 165 is adjusted. If the lift perpendicular to the tow line 105 is greater than the drag perpendicular to the tow line 105, the driven element 165 will accelerate perpendicular to the tow line 105. The driven element 165 can be flown at a selected speed perpendicular to the tow line 105, and can be flown in a selected pattern, by constant adjustment of the lengths of the control lines.

The lift of the driven element 165 is proportional to the square of the velocity of the apparent wind flowing perpendicular to the upper spar 168. The velocity of the apparent wind flowing perpendicular to the upper spar 168 will generally increase as the velocity of the driven element 106 perpendicular to the tow line 105 increases. By adjusting the elevation and azimuth angles of the driven element 165 the driven element 165 can be flown in a circle at high speed. The forces are balanced with inwardly directed force providing centripetal acceleration, forwardly directed force balancing with the drag, and the force parallel to the tow line 105 providing the force that pulls on the revolving apparatus 205.

To prevent tangling, when the first and second upper control lines 175 and 176, and the tow line 105, all attach to the turntable 209, the driven element 165 is flown in a pattern of two connected circles, as shown, flying clockwise through one circle and counter-clockwise through the other circle. By flying the driven element 165 through the pattern at high speed, the total lift and the lift parallel to the tow line 105 are increased, increasing the power generated by the aerial wind power generation system 103.

Figure 28:
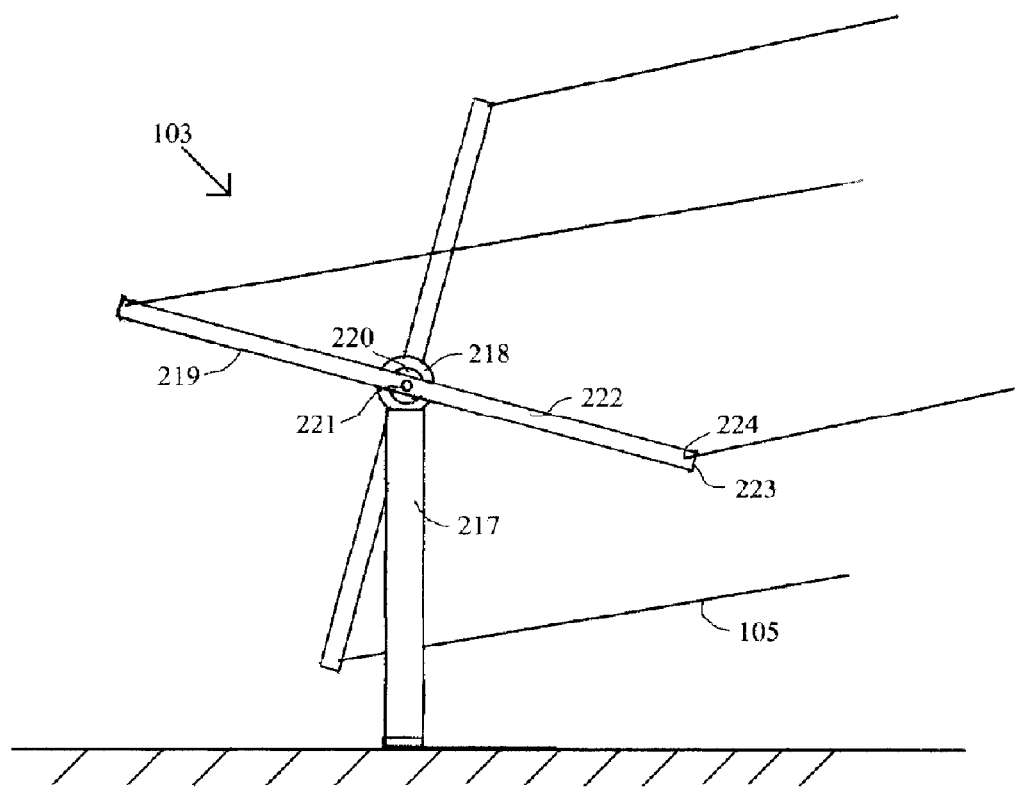
FIG. 28 is a side elevation view of another revolving apparatus of the system of FIG. 13.

Referring to FIG. 28, another variation of the aerial wind power generation system 103 has an elongated, substantially vertical tower 217, a nacelle 218 rotatably mounted about a vertical axis on top of the tower 217, a revolving apparatus 219, and a means for generating power 220. The revolving apparatus 219 has a shaft 221 that is rotatably mounted on and extends horizontally though the nacelle 218. A beam 222 is rigidly mounted on the shaft 221 on each side of the nacelle 218, each beam 222 extending in both directions perpendicular to the shaft 221 to ends 223. The two beams 222 are mounted on the shaft 221 at right angles to each other. A tow line attachment point 224 is provided at each end 223 of each beam 222. Tow lines 105 connect from the tow line attachment points 224 to the driven elements 145. The means for generating power 220 is mounted in the nacelle 218 and driven by rotation of the shaft 221. The azimuth angles of the driven elements 145 are adjusted such that the driven elements 145 fly slightly off to the sides, to prevent tangling of the tow lines 105.

Figure 29:
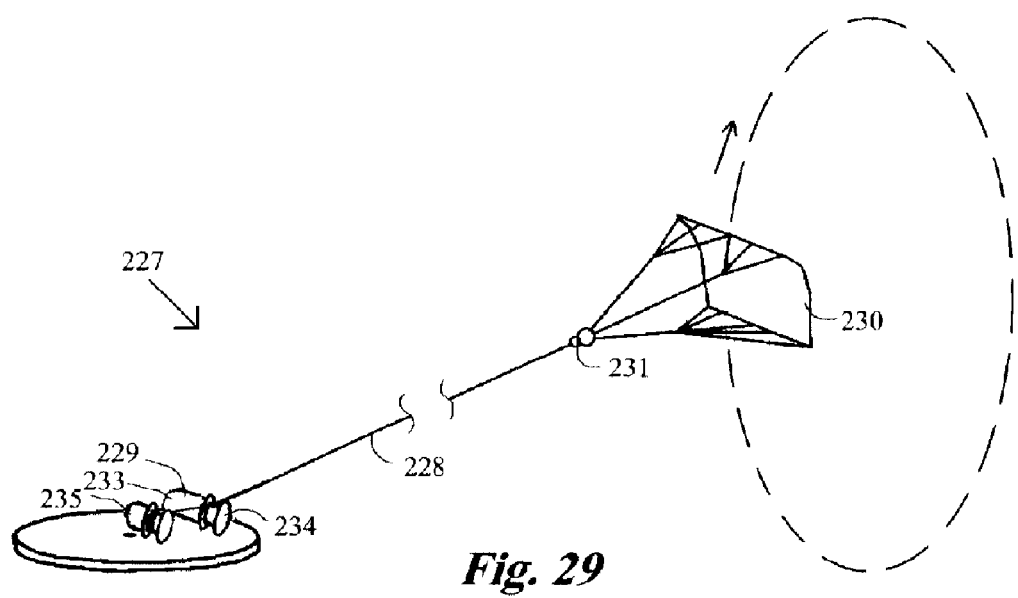
FIG. 29 is a perspective view of another aerial wind power generation system embodying features of the present invention.

FIG. 29 shows another power generation system 227 having a tow line 228 connected to a means for generating power 229 at one end and to a driven element 230 by a swivel 231 at the opposite end. The driven element 230 includes means for changing the driven element 230 between high force and low force configurations, and means for adjusting the azimuth and elevation angle of the driven element 230. The driven element 230 can be similar to the driven element 165 as shown in FIG. 24, driven element 195 as shown in FIGS. 25-26, or other driven element with means for adjusting the elevation and azimuth angles.

The means for generating power 229 includes a generator 233 connected to a capstan 234. A winch 235 is provided behind the capstan 234 for reeling the tow line 228. The tow line 228 is wrapped around the capstan 234 and turns the capstan 234 to turn the generator 233. The arrangement with a separate capstan 234 and winch 235 prevents excess tension on the wraps of tow line 228 on the winch. The driven element 230 is flown at a high velocity perpendicular to the tow line 228 in a generally circular pattern while the tow line 228 pulls out from the means for generating power 229, forming a corkscrew flight path. When the tow line 228 extends to a predetermined distance, the driven element 230 is changed to a low force configuration and reeled back towards the means for generating power 229. By flying the driven element 230 through the pattern at high speed, the total lift and the lift parallel to the tow line 228 are increased, increasing the power generated by the aerial wind power generation system 227.

Figure 30:
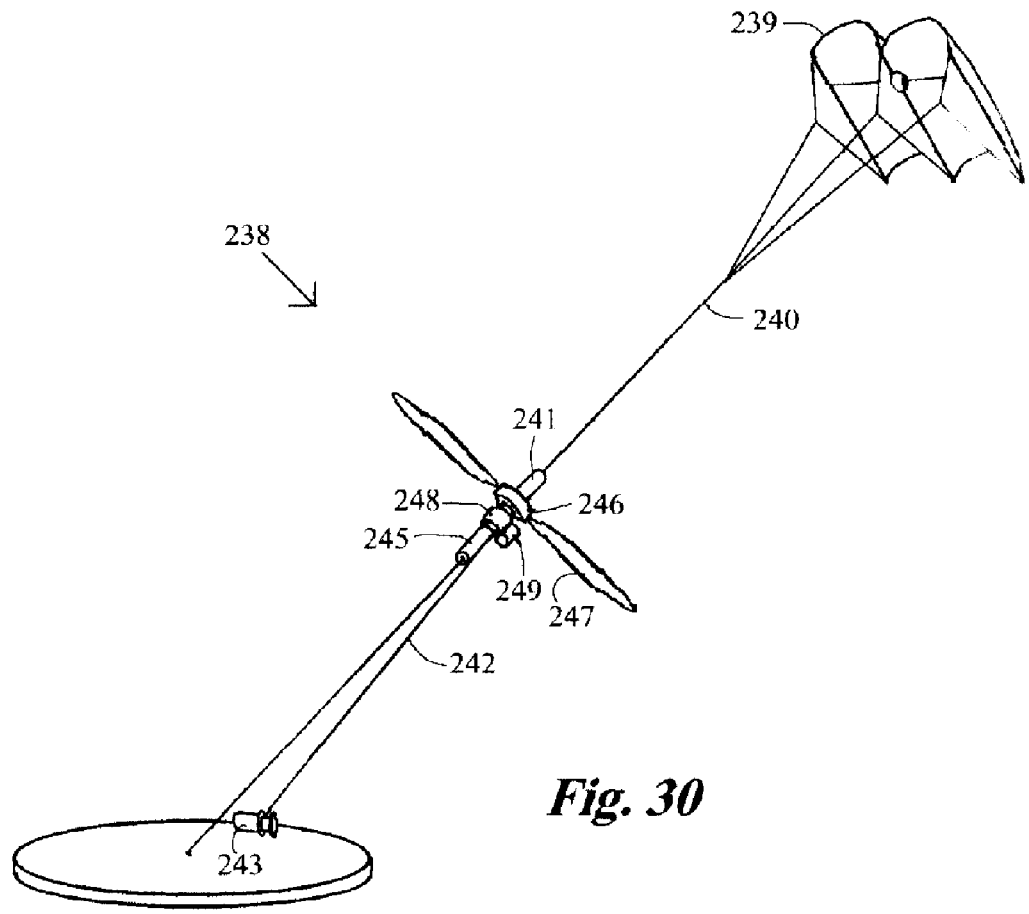
FIG. 30 is a perspective view of another aerial wind power generation system embodying features of the present invention.

Referring to FIG. 30, another power generation system 238 includes a support body 239, a guide line 240, a driven element 241, a tow line 242, and a means for generating power 243. The guide line 240 is tethered at one end at the ground or to a structure, and extends skywardly at a selected elevation angle with the other end being attached to the support body 239. The tow line 242 is connected to and drives the means for generating power 243.

The driven element 241 has a sleeve 245, a hub 246, a plurality of airfoil blades 247, and a pitch control mechanism 248. The sleeve 245 is slidably mounted on the guide line 240 and connected to one end of the tow line 242. The hub 246 is rotatably mounted on the sleeve 245. The blades 247 preferably have a twisted shape as in propeller or wind turbine rotor blades. The blades 247 are circumferentially spaced on the hub 246 and extend radially therefrom in a plane perpendicular to the guide line 240. The pitch control mechanism 248 links to the blades 247, providing a means for adjusting the pitch of the blades 247 and a means for changing the driven element 241 between high force and low force configurations.

The pitch control mechanism 248 can be controlled by a remote control module 249 mounted on the sleeve 245, as shown, and/or by other sensors such as an altimeter or GPS. The blades 247 are adjusted to spin in response to the wind to change the driven element 241 to a high or low force configuration. As the speed of the blades 247 increases, the direction of the lift from the blades 247 rotates towards the direction of the tow line 242, increasing the force in the direction of the tow line 242. The blades 247 are adjusted such that the lift and drag are minimized while the driven element 241 is in the low force configuration.

Figure 31:
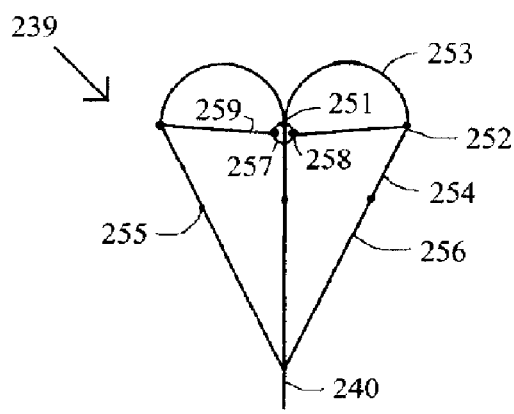
FIG. 31 is a front elevation view of a support body for the system of FIG. 30.
Figure 32:
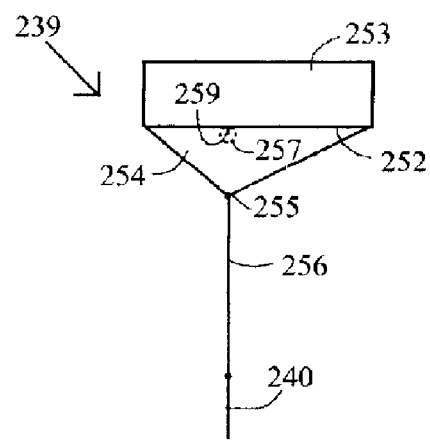
FIG. 32 is a side elevation view of the support body of FIG. 31.

Referring to FIGS. 31 and 32, the support body 239 is shaped generally like a double sled kite, having a longitudinal middle spar 251 between two spaced, longitudinal side spars 252, and a sail portion 253 connecting the middle and side spars 251 and 252. A triangular wing 254 extends downwardly from each of the middle spar 251 and side spars 252 to a corner 255. The corners 255 are closer to the front than the back of the support body 239. A bridle line 256 connects to each corner 255. The three bridle lines 256 converge and connect to the guide line 240.

A control module 257 mounts on the middle spar 251, forward of the centerline of the support body 239. The control module 257 includes two winches 258. Each winch 258 has a control line 259 that connects to a side spar 252. The control lines 259 can pull the side spars 252 inwardly to change the shape of the support body 239. Pulling inwards with one control line 259 causes the support body 239 to fly to one side. Pulling inwards or reeling out both control lines 259 changes the lift and drag of the support body 239. The instrumentation in the control module 257 can provide automatic correction and/or the instrumentation can be remotely controlled. The instrumentation in the control module 257 can provide self-stabilization of the support body 239 in response to wind fluctuation.

Other configurations can be used for the support body 239 and the first and second support bodies 15 and 72, described above. By way of example and not as a limitation, the designs of the driven elements that include azimuth and elevation angle adjustment can be used as support bodies, including the driven element 145, shown in FIGS. 19 and 20, the driven element 165, shown in FIGS. 21-24 and the driven element 195, shown in FIGS. 25 and 26. Similarly, a support body such as the support body 239, as shown in FIGS. 31 and 32, that can be changed between high force and low force configurations, is also suitable for use as a driven element. Although the driven elements and support bodies are each generally shown and described herein as a single element, the driven elements and support bodies can each be implemented in trains of two or more units.

Figure 33:
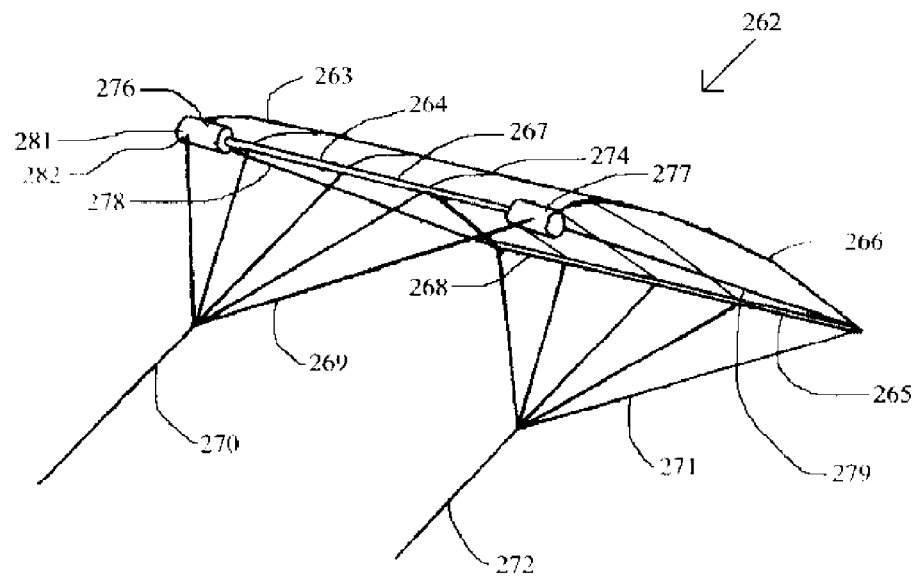
FIG. 33 is a perspective view of a wind driven apparatus embodying features of the present invention.

FIG. 33 shows a wind driven apparatus 262, embodying features of the present invention, including a driven element 263 having an upper spar 264, a lower spar 265 spaced from the upper spar 264, and a trapezoidal sail portion 266 with a leading edge 267 attaching to the upper spar 264 and a trailing edge 268 attaching to the lower spar 265. More particularly, the sail portion 266 shown is rectangular. A plurality of upper bridle lines 269 connect in a spaced arrangement to the upper spar 264 and converge to connect to a first tow line 270. A plurality of lower bridle lines 271 connect in a spaced arrangement to the lower spar 265 and converge to connect to a second tow line 272. A plurality of spaced, flexible, longitudinal spars or battens 274 extend longitudinally along the sail portion 266 transverse to the upper and lower spars 264 and 265, to flatten the sail portion 266 in low force configurations and to shape the sail portion 266 into an airfoil shape in high force configurations.

A remote control first winch 276 mounts on one end of the upper spar 264 and a spaced, remote control second winch 277 mounts on the other end of the upper spar 264. A first tension line 278 extends from the first winch 276 and attaches to the end of the lower spar 265 opposite the first winch 276. A second tension line 279 extends from the second winch 277 and attaches to the end of the lower spar 265 opposite the second winch 277. Shortening the first and second tension lines 278 and 279 with the first and second winches 276 and 277 increases the camber in the sail portion 266 and lengthening the first and second tension lines 278 and 279 flattens the sail portion 266.

The first and second winches 276 and 277 with the first and second tension lines 278 and 279 provide a means for controlling 281 the camber of the sail portion 266. By increasing camber, the force on the driven element 263 can be maximized in high force configurations. When the driven element 263 is in low force configurations, decreasing the camber and flattening the sail portion 266 minimizes the force.

Differential lengthening or shortening of the first and second tension lines 278 and 279 relative to each other imparts greater camber to a side of the sail portion 266 and creates greater lift on one side of the sail portion 266 relative to the other side. The adjustment of lift side-to-side on the sail portion 266 provides roll control and a means for adjusting 282 the azimuth angle of the driven element 263. Alternatively, the first and second winches 276 and 277 can be mounted on the lower spar 265 with the first and second tension lines 278 and 279 connecting to the upper spar 264. As with many of the previously described driven elements, a train of driven elements 263 can be used instead of a single driven element 263.

Figure 34:
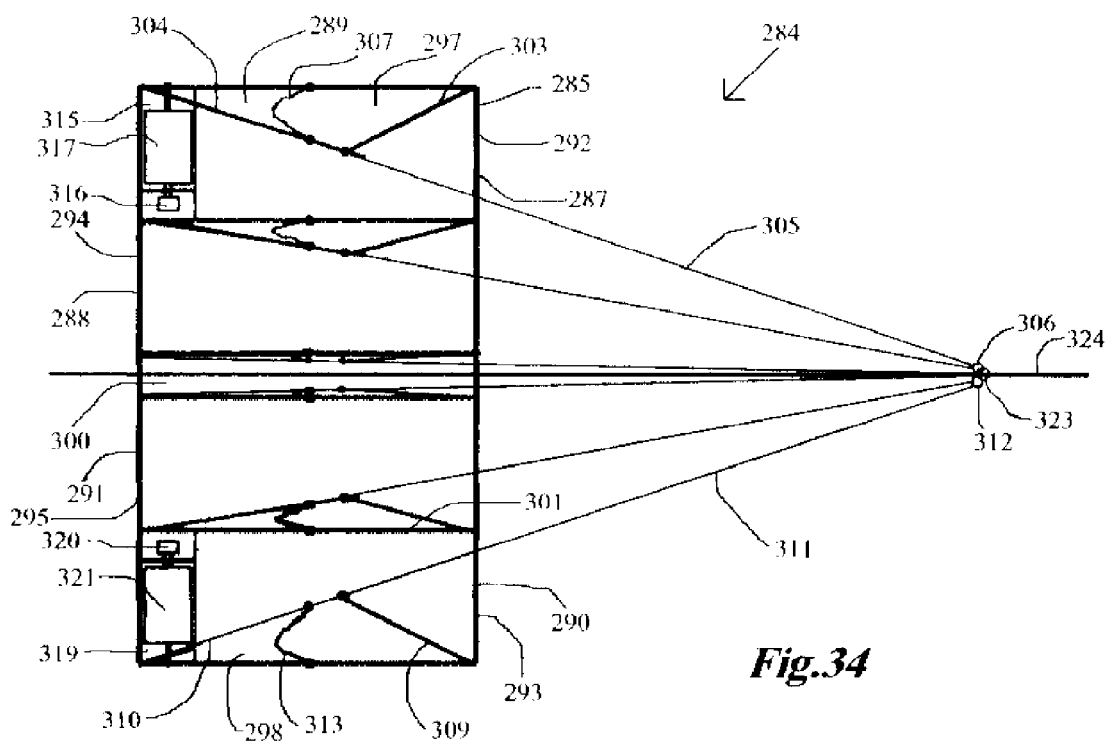
FIG. 34 is a bottom plan view of another wind driven apparatus embodying features of the present invention.
Figure 35:
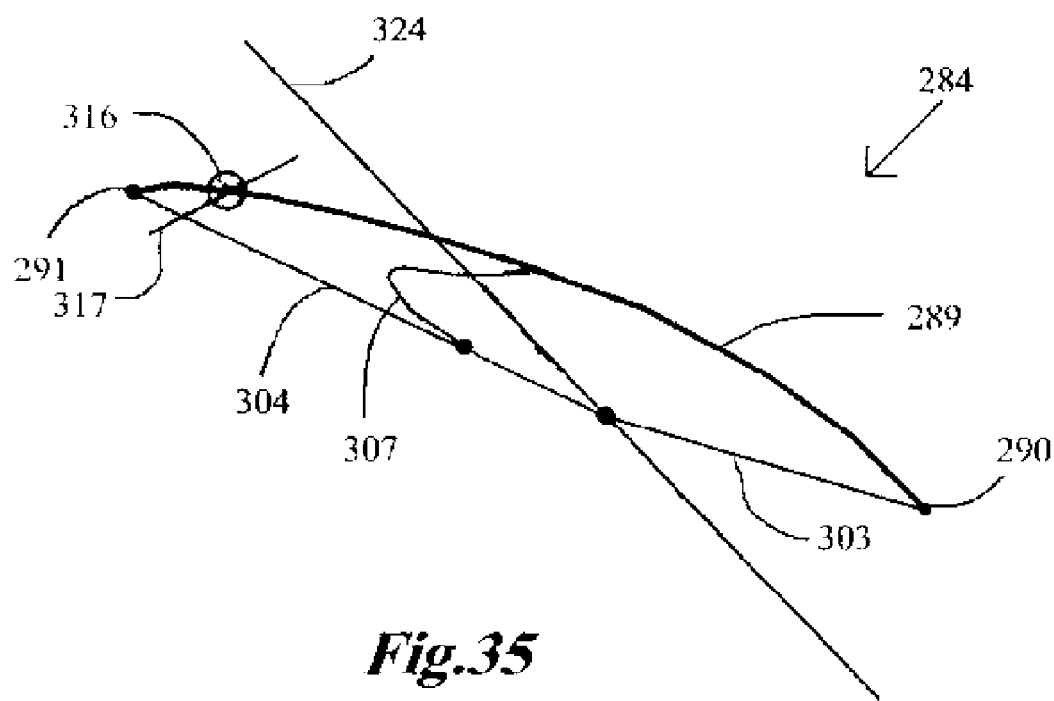
FIG. 35 is a side elevation view of the wind driven apparatus of FIG. 34 in a low force configuration.
Figure 36:
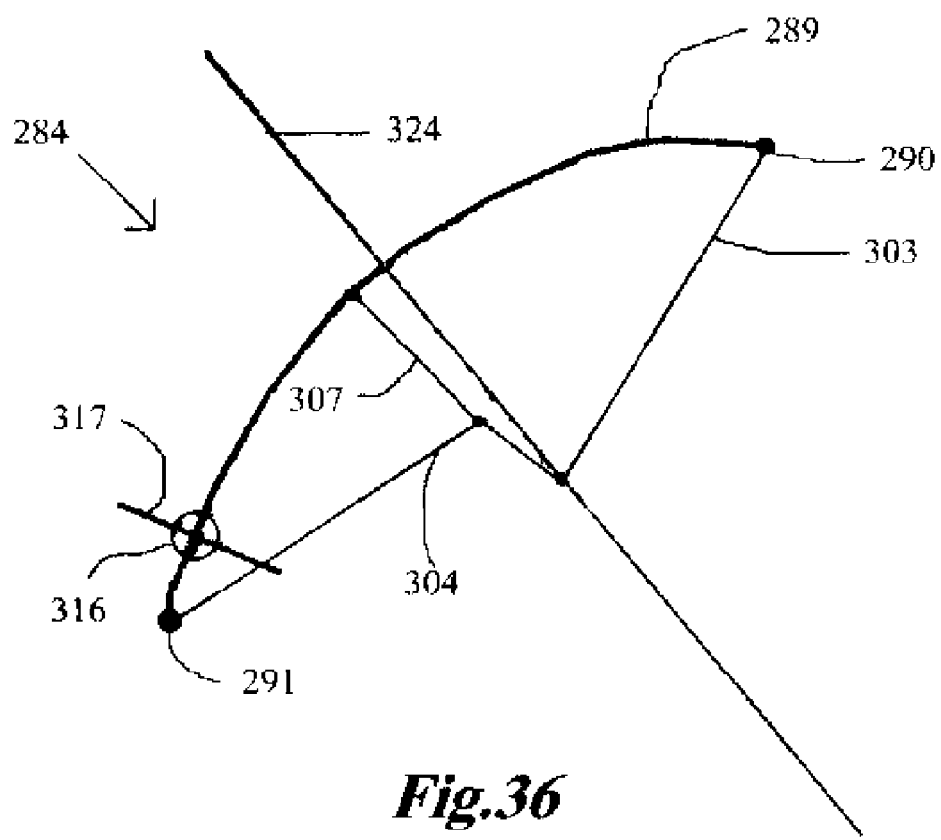
FIG. 36 is a side elevation view of the wind driven apparatus of FIG. 34 in a high force configuration.

Referring to FIGS. 34, 35 and 36, another wind driven apparatus 284 embodying features of the present invention includes driven element 285 having an upper spar 287, a parallel lower spar 288 spaced from the upper spar 287, and a substantially rectangular sail portion 289 having a leading edge 290 and a trailing edge 291. The sail portion 289 shown is rectangular, but can be another trapezoidal shape. The upper spar 287 has first and second sections 292 and 293 that are rigidly and detachably coupled together. The lower spar 288 has first and second sections 294 and 295 that are rigidly and detachably coupled together. A first section 297 of the sail portion 289 extends between the first sections 292 and 294 of the upper and lower spars 287 and 288. A spaced second section 298 of the sail portion 289 extends between the second sections 293 and 295 of the upper and lower spars 287 and 288.

A gap 300 is provided between the first and second sections 297 and 298 of the sail portion 289. A plurality of spaced, flexible, longitudinal spars or battens 301 extend longitudinally along the first and second sections 297 and 298 of the sail portion 289 transverse to the upper and lower spars 287 and 288, to flatten the sail portion 289 in low force configurations and to shape the sail portion 289 into an airfoil shape in high force configurations.

A plurality of first upper bridle lines 303 connect at one end in a spaced arrangement to the first section 292 of the upper spar 287 and a plurality of first lower bridle lines 304 connect at one end in a spaced arrangement to the first section 294 of the lower spar 288. The other end of each first upper bridle line 303 connects to the other end of a first lower bridle line 304 and to one end of a first common bridle line 305. The other ends of the first common bridle lines 305 connect together and to a first snap connector 306.

A plurality of first intermediate bridle lines 307 connect at one end in a spaced arrangement to the first section 297 of the sail portion 289 intermediate the first sections 292 and 294 of the upper and lower spars 287 and 288. The other end of each first intermediate bridle line 307 connects to a first lower bridle line 304, intermediate the ends of the respective first lower bridle line 304.

A plurality of second upper bridle lines 309 connect at one end in a spaced arrangement to the second section 293 of the upper spar 287 and a plurality of second lower bridle lines 310 connect at one end in a spaced arrangement to the second section 295 of the lower spar 288. The other end of each second upper bridle line 309 connects to the other end of a second lower bridle line 310 and to one end of a second common bridle line 311. The other ends of the second common bridle lines 311 connect together and to a second snap connector 312.

A plurality of second intermediate bridle lines 313 connect at one end in a spaced arrangement to the second section 298 of the sail portion 289 intermediate the second sections 293 and 295 of the upper and lower spars 287 and 288. The other end of each second intermediate bridle line 313 connects to a second lower bridle line 310, intermediate the ends of the respective second lower bridle line 310.

The first section 297 of the sail portion 289 has a substantially rectangular first aperture 315 adjacent to the outer end of the first section 294 of the lower spar 288. A remote control first servo 316 mounts on the first section 294 of the lower spar 288 and extends into the inward end of the first aperture 315. A first airfoil 317 mounts on the first servo 316 and extends outwardly therefrom in the first aperture 315. The first servo 316 rotates the first airfoil 317 about an axis that is parallel to the lower spar 288.

The second section 298 of the sail portion 289 has a substantially rectangular second aperture 319 adjacent to the outer end of the second section 295 of the lower spar 288. A remote control second servo 320 mounts on the second section 295 of the lower spar 288 and extends into the inward end of the second aperture 319. A second airfoil 321 mounts on the first servo 320 and extends outwardly therefrom in the second aperture 319. The second servo 320 rotates the second airfoil 321 about an axis that is parallel to the lower spar 288.

The first and second snap connectors 306 and 312 connect to a ring 323 on a tow line 324. When a train of driven elements 285 is deployed, the tow line 324 extends through the gap 300. The first and second intermediate bridle lines 307 and 313 each have a selected length. As shown in FIG. 36, the first and second intermediate bridle lines 307 and 313 limit the camber of the sail portion 289 to a selected maximum camber when the driven element 285 is in a high force configuration, providing a means for controlling camber. As shown in FIG. 35, the first and second intermediate bridle lines 307 and 313 are slack and allow the sail portion 289 to flatten when the driven element 285 is in a low force configuration.

The first and second airfoils 317 and 321 act as elevons, functioning as both elevators and ailerons. The first and second airfoils 317 and 321 rotate to adjust the pitch angle of the driven element 285, providing a means for changing the driven element 285 to a high or low force configuration. Differential rotation of the first and second airfoils 317 and 320 provides roll control and a means for adjusting the azimuth angle of the driven element 285.

Instead of the first and second airfoils 317 and 321, a single servo and an airfoil that functions as an elevator could be mounted at the center of the lower spar 288 to control the pitch angle of the driven element. A rudder with a remote control servo can also be provided, to provide yaw control. The detachable first and second sections 292 and 293 of the upper spar 287, and the detachable first and second sections 294 and 295 of the lower spar 288 allow the driven element 285 to be disassembled into two parts for easier handling on the ground. The first and second snap connectors 306 and 312 provide quick attachment of the driven element 285 to the tow line 324.

Figure 37:
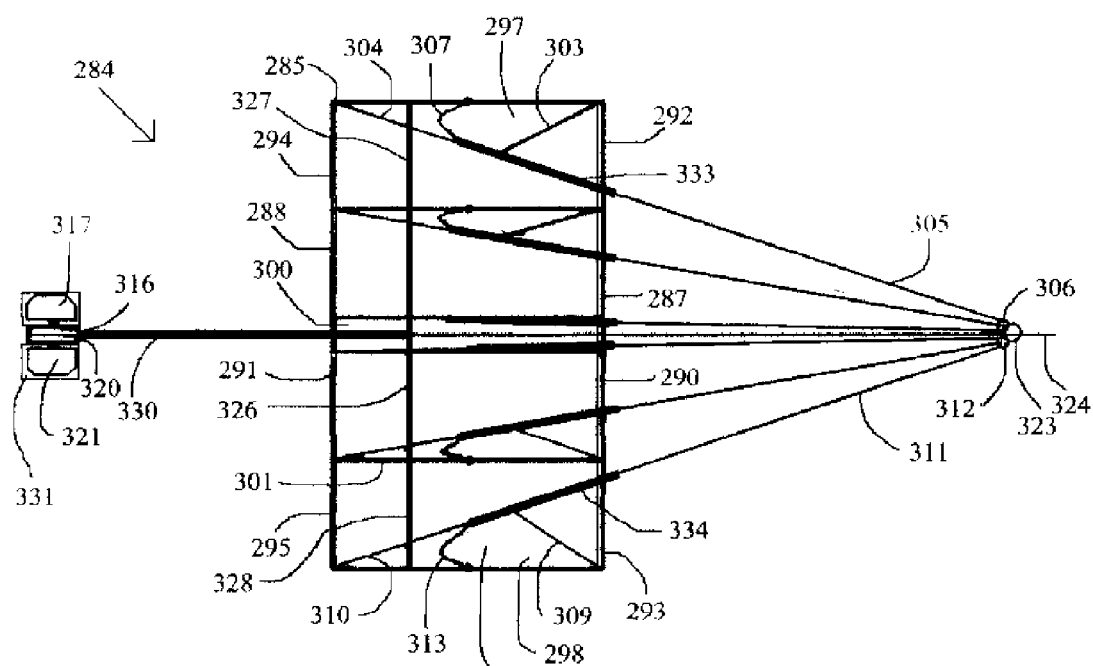
FIG. 37 is a bottom plan view of the wind driven apparatus of FIG. 34 with an alternative airfoil arrangement.

FIGS. 37, 38 and 39 show the wind driven apparatus 284 with the driven element 285 having a different airfoil arrangement. The driven element 285 does not include the first and second apertures 315 and 319 in the sail portion 289. An intermediate spar 326 has first and second sections 327 and 328 that are rigidly and detachably coupled together. The intermediate spar 326 is attached to and extends across the sail portion 289, parallel to the lower spar 288. The intermediate spar 326 is spaced from the lower spar 288 about one quarter to one third of the distance from the upper spar 287 to the lower spar 288.

One end of a rigid, generally straight tail spar 330 detachably mounts to the intermediate spar 326 at the connection of the first and second sections 327 and 328, and an intermediate portion of the tail spar 330 detachably mounts to the lower spar 288 at the connection of the first and second sections 294 and 295. The tail spar 330 extends perpendicular to and rearwardly from the lower spar 288. The first and second servos 316 and 320 are mounted on the other end of the tail spar 330. The first and second airfoils 317 and 321 mount on the first and second servos 316 and 320, respectively, with the axis of rotation being parallel to the lower spar 288. A protective cage 331 can be mounted around the first and second airfoils 317 and 321 to prevent damage. The tail spar 330 can be detached for storage and easier handling of the driven element 285 on the ground.

A rigid first bridle tube 333 extends around the upper portion of each first common bridle line 305, past the connection of the first upper and lower bridle lines 303 and 304, and around each first lower bridle line 304 to the connection of the first lower and intermediate bridle lines 304 and 307. A rigid second bridle tube 334 extends around the upper portion of each second common bridle line 311, past the connection of the second upper and lower bridle lines 309 and 310, and around each second lower bridle line 310 to the connection of the second lower and intermediate bridle lines 310 and 313. As shown in FIG. 39, the first and second bridle tubes 333 and 334 shorten the effective length of the first upper and lower bridle lines 303 and 304 and the second upper and lower bridle lines 309 and 310, inducing maximum camber into the sail portion 289, when the driven element is in a high force configuration.

As shown in FIGS. 38 and 39, in a train of driven elements 285, a control line 336 links the lower spars 288. When the lower spars 288 are linked, the tail spar 330 and first and second airfoils 317 and 321 are not required on every driven element 285. In FIGS. 38 and 39, every second driven element 285 includes a tail spar 330 and first and second airfoils 317 and 321.

Figure 40:
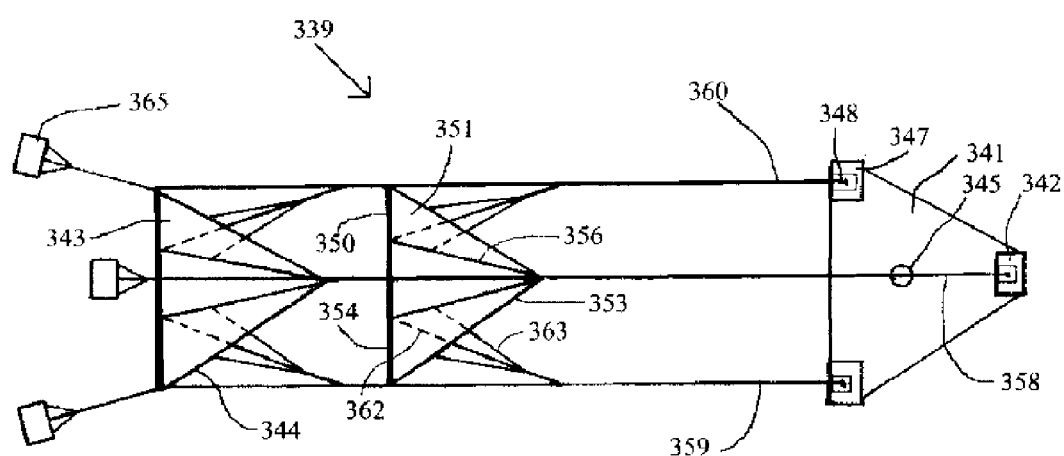
FIG. 40 is a top plan view of another aerial wind power generation system embodying features of the present invention.
Figure 41:
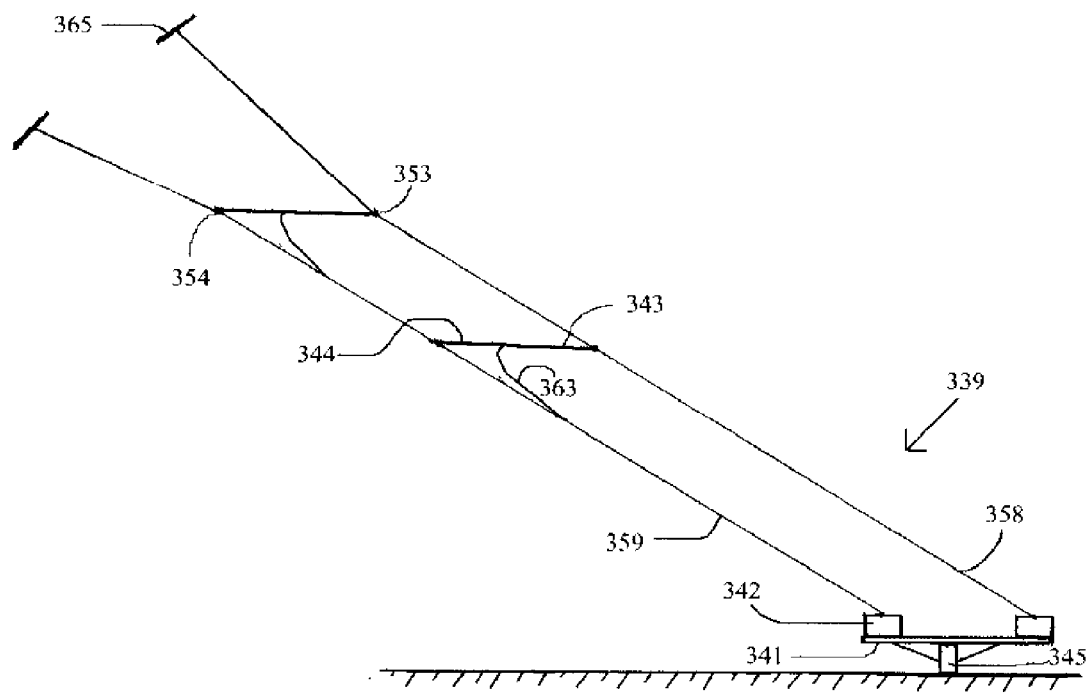
FIG. 41 is a side elevation view of the system of FIG. 40 with the wind driven apparatus in a low force configuration.
Figure 42:
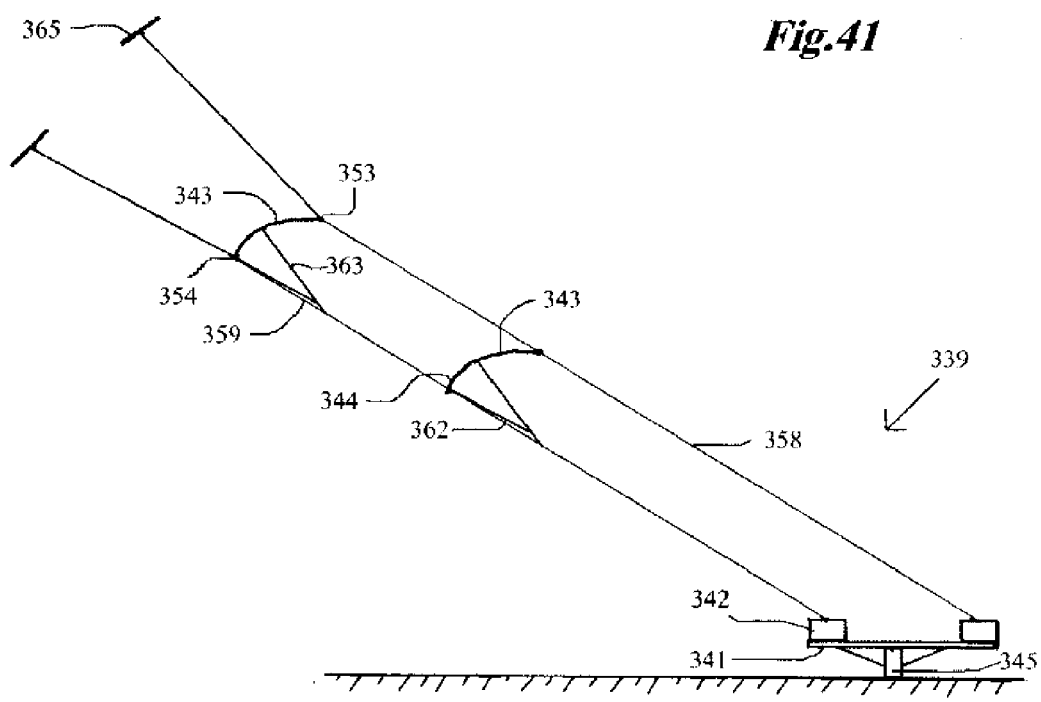
FIG. 42 is a side elevation view of the system of FIG. 40 with the wind driven apparatus in a high force configuration.

Referring to FIGS. 40, 41 and 42, another aerial wind power generation system 339 embodying features of the present invention includes a rotating platform 341, three means for generating power 342 and a plurality of wind driven apparatus 344 with driven elements 343. The platform 341 is generally triangular and horizontal, rotating around a central pivot 345 with a vertical axis so as to keep one corner of the platform 341 pointed into the wind. Each means for generating power 342 is mounted in one of the corners of the platform 341 and includes a motor/generator 347 and a winch reel 348. A capstan reel might also be used here if needed.

Each driven element 343 includes a lower spar 350 and a sail portion 351. The sail portion 351 is generally triangular in shape with two sides forming a leading edge 353 and the third side forming a trailing edge 354. The lower spar 350 attaches along the trailing edge 354 of the sail portion 351. A plurality of spaced, flexible, longitudinal spars or battens 356 extend longitudinally along the sail portion 351 transverse to the lower spar 350. Additional spars parallel to the lower spar 350 might also be used to strengthen the structure if needed.

A leading edge control line 358 connects to a winch reel 348. The forward corner of the leading edge 353 of the sail portion 351 of each of the driven elements 343 attaches to the leading edge control line 358 with the driven elements 343 being spaced along the leading edge control line 358. Spaced first and second trailing edge control lines 359 and 360 connect to the other two winch reels 348. One end of each lower spar 350 attaches to the first trailing edge control line 359 and the other end of each lower spar 350 attaches to the second trailing edge control line 360.

Lower bridle lines 362 connect between intermediate portions of the lower spar 350 and the first and second trailing edge control lines 359 and 360. Intermediate bridle lines 363 connect between intermediate portions of the sail portion 351 and each of the first and second trailing edge control lines 359 and 360 and each of the lower bridle lines 362. The intermediate bridle lines 363 each have a selected length so that, as shown in FIG. 42, the intermediate bridle lines 363 limit the camber of the sail portion 351 to a selected maximum camber when the driven element 343 is in a high force configuration, providing a means for controlling camber. As shown in FIG. 41, the intermediate bridle lines 363 are slack when the driven element 343 is in a low force configuration.

A remote control pilot kite 365 can be attached to each corner of the sail portion 351 of the top driven element 343 to enhance the stability of the array of driven elements 343. Differential control of the leading edge control line 358 relative to the first and second trailing edge control lines 359 and 360 provides a means for adjusting the pitch angle of the driven elements 343 and thereby a means for changing the driven elements 343 between high and low force configurations. Differential control of the first and second trailing edge control lines 359 and 360 relative to each other provides roll control and a means for adjusting the azimuth angle of the driven elements 343. A gear-motor might be used to control the azimuth angle of the rotating platform 341. Such a gear-motor can be used to actively maintain the alignment of the rotating platform 341 with respect to the wind direction, and can also be part of a feedback loop to provide roll control of the driven elements 343, either in addition to or instead of the means described above.

FIGS. 43 and 44 show a train of the wind driven apparatus 284 having driven elements 285 without airfoils. A remote control pilot kite 367 attaches to the upper end of the tow line 324. Two remote control upper winches 368 are mounted side-by-side on the tow line 324, between the pilot kite 367 and the uppermost driven element 285. Upper control lines 369 extend from the two upper winches 368 and attach to opposite ends of the lower spar 288 of the uppermost driven element 285. Tie lines 371 connect the ends of the lower spars 288 of successive driven elements 285. Two remote control lower winches 372 are mounted side-by-side on the tow line 324 below the lowest driven element 288. Lower control lines 373 extend from the two lower winches 372 and attach to opposite ends of the lower spar 288 of the lowest driven element 285.

Shortening the lower control lines 373 and lengthening the upper control lines 369 changes the driven elements 285 to a high force configuration. Shortening the upper control lines 369 and lengthening the lower control lines 373 changes the driven elements 285 to a low force configuration. The upper and lower winches 368 and 372 provide a means for changing the driven elements 285 between high and low force configurations. Differential control of the upper and lower winches 368 and 372 provides a means for adjusting the azimuth angle of the driven elements 285.

In the aerial wind power generation system 339 shown in FIGS. 40, 41 and 42 a single remote control pilot kite 365 can be attached to the leading edge control line 358 instead of a pilot kite 365 being attached to each corner of the sail portion 351 of the top driven element 343. A pair of upper winches similar to the upper winches 368 can attach between the pilot kite 365 and the top driven element 363 with upper control lines attaching to opposite ends of the lower spar 350.

Although the present invention has been described with a certain degree of particularity, it is understood that the present disclosure has been made by way of example and that changes in details of structure may be made without departing from the spirit thereof.

What is claimed is:

1. Wind driven apparatus for an aerial power generation system for generation of power from the wind, comprising:
a driven element including a trapezoidal sail portion, an upper spar, a spaced lower spar, and a plurality of spaced battens, said driven element having a high force configuration and a low force configuration, a pitch angle and an azimuth angle, said driven element having, when in said high force configuration, an airfoil shape, said sail portion having a leading edge, a trailing edge, and a camber, said upper spar being connected to and extending laterally along said leading edge of said sail portion, said lower spar being connected to and extending laterally along said trailing edge of said sail portion, and said battens being connected to and extending longitudinally along said sail portion for flattening said sail portion,
means, connected to said sail portion, for changing said driven element between said high force and low force configurations while in flight, and
means for controlling said camber of said sail portion while said sail portion is in flight,
whereby said camber is increased when said driven element is in a high force configuration and said driven element is flattened when said sail portion is in a low force configuration, and whereby said means for changing changes said sail portion to a said high force configuration to generate power, and said means for changing changes said sail portion to a said low force configuration to pull said sail portion upwind.

2. The apparatus as set forth in claim 1 wherein said means for changing includes a first tow line connected to said upper spar and a second tow line connected to said lower spar,
whereby said means for changing effectively shortens and lengthens said second tow line relative to said first tow line to change said driven element between high force and low force configurations.

3. The apparatus as set forth in claim 2 wherein said means for changing includes a remote control winch mounted on said first tow line and spaced from said upper spar, said winch being connected to said second tow line opposite said lower spar,
whereby said winch effectively shortens and lengthens said second tow line relative to said first tow line to change said driven element between high force and low force configurations.

4. The apparatus as set forth in claim 1 wherein said means for changing changes said pitch angle to change said sail portion between high force and low force configurations.

5. The apparatus as set forth in claim 4 wherein said means for changing includes a remote control airfoil connected to one of said upper and lower spars,
whereby said airfoil raises and lowers said spar to change said pitch angle to change said driven element between high force and low force configurations.

6. The apparatus as set forth in claim 1 wherein said means for controlling includes at least one remote control winch mounted on one of said upper and lower spars, and said winch includes a tension line connected to said other one of said upper and lower spars,
whereby effectively shortening said tension line with said winch increases said camber and effectively lengthening said tension line flattens said sail portion.

7. The apparatus as set forth in claim 1:
including a plurality of upper bridle lines that connect at one end in a spaced arrangement to said upper spar, and a plurality of lower bridle lines that connect at one end in a spaced arrangement to said lower spar, and
wherein said means for controlling includes a plurality of intermediate bridle lines that each connect at one end to said sail portion intermediate said upper and lower spars and connect at the opposite end to one of said lower bridle lines intermediate the ends of said lower bridle line, said intermediate bridle lines each having a selected length to limit said camber to a selected maximum camber when said driven element is in a high force configuration.

8. The apparatus as set forth in claim 1 wherein said means for controlling includes a remote control airfoil connected to one of said upper and lower spars,
whereby said airfoil raises and lowers said spar to control said camber.

9. The apparatus as set forth in claim 1 including means for adjusting said azimuth angle.

10. The apparatus as set forth in claim 9 wherein said means for adjusting includes first and second control lines connected near opposite ends of one of said upper and lower spars,
whereby said azimuth angle is adjusted by differential effective lengthening and shortening of said first and second control lines.

11. The apparatus as set forth in claim 10 wherein said means for adjusting includes a winch connected to said first control line opposite said one of said upper and lower spars for differential effective lengthening and shortening of said first and second control lines.

12. The apparatus as set forth in claim 9 wherein said means for adjusting includes remote control first and second winches mounted on opposite ends of one of said upper and lower spars, and first and second tension lines attached to said first and second winches, respectively, and connecting to opposite ends of said other one of said upper and lower spars,
whereby differential effective lengthening and shortening of said first and second tension lines creates differential camber in said sail portion and thereby adjusts said azimuth angle.

13. The apparatus as set forth in claim 9 wherein said means for adjusting includes spaced, remote control first and second airfoils attached at opposite ends of one of said upper and lower spars,
whereby differential adjustment of said first and second airfoils adjusts said azimuth angle.

14. Wind driven apparatus for an aerial power generation system for generation of power from the wind, comprising:
a driven element including a trapezoidal sail portion, an upper spar, a spaced lower spar, and a plurality of spaced battens, said driven element having a high force configuration and a low force configuration, a pitch angle and an azimuth angle, said driven element having, when in said high force configuration, an airfoil shape, said sail portion having a leading edge, a trailing edge, and a camber, said upper spar being connected to and extending laterally along said leading edge of said sail portion, said lower spar being connected to and extending laterally along said trailing edge of said sail portion, and said battens being connected to and extending longitudinally along said sail portion for flattening said sail portion, means, connected to said driven element, for changing said driven element between said high force and low force configurations while in flight, means for controlling said camber of said sail portion while said driven element is in flight, and means for adjusting said azimuth angle, whereby said means for changing changes said driven element to a said high force configuration to generate power, and said means for changing changes said driven element to a said low force configuration to pull said driven element upwind.

15. Wind driven apparatus for an aerial power generation system for generation of power from the wind, comprising:

a driven element including a sail portion, a lower spar, and a plurality of spaced battens, said driven element having a high force configuration and a low force configuration, a pitch angle and an azimuth angle, said driven element having, when in said high force configuration, an airfoil shape, said sail portion having a leading edge, a trailing edge, and a camber, said lower spar being connected to and extending laterally along said trailing edge of said sail portion, and said battens being connected to said sail portion and extending transverse to said lower spar for flattening said sail portion, means, connected to said driven element, for changing said driven element between said high force and low force configurations while in flight, means for controlling said camber of said sail portion while in flight, and means for adjusting said azimuth angle, whereby said means for changing changes said driven element to a said high force configuration to generate power, and said means for changing changes said driven element to a said low force configuration to pull said driven element upwind.

16. The apparatus as set forth in claim 15 wherein said sail portion has a substantially triangular shape.

17. The apparatus as set forth in claim 15 wherein said means for adjusting includes spaced, independently controlled first and second control lines connected to opposite ends of said lower spar.

18. The apparatus as set forth in claim 15 wherein:

said means for changing includes a leading edge control line that connects to said leading edge, said means for adjusting includes a first trailing edge control line that connects to one end of said lower spar and a spaced second trailing edge control line that connects to the other end of said lower spar, and said means for controlling includes a plurality of intermediate bridle lines that each connect at one end to said sail portion intermediate said leading edge and said lower spar and connect at the opposite end to one of said first and second trailing edge control lines, said intermediate bridle lines each having a selected length to limit said camber to a selected maximum camber when said driven element is in a high force configuration.

19. The apparatus as set forth in claim 15 wherein said means for controlling includes a remote control winch mounted on said lower spar, and said winch includes a tension line connected to said leading edge, whereby effectively shortening said tension line with said winch increases said camber and effectively lengthening said tension line flattens said sail portion.

20. Wind driven apparatus for an aerial power generation system for generation of power from the wind, comprising:

a driven element including a sail portion, a lower spar, and a plurality of spaced battens, said driven element having a high force configuration and a low force configuration, a pitch angle and an azimuth angle, said driven element having, when in said high force configuration, an airfoil shape, said sail portion having a leading edge, a trailing edge, and a camber, said lower spar being connected to and extending laterally along said trailing edge of said sail portion, and said battens being connected to said sail portion and extending transverse to said lower spar for flattening said sail portion, a leading edge control line that connects to said leading edge, for changing said driven element between high force and low force configurations while said sail portion is in flight, a first trailing edge control line that connects to one end of said lower spar and a spaced second trailing edge control line that connects to the other end of said lower spar, for adjusting said azimuth angle, and a plurality of intermediate bridle lines that each connect at one end to said sail portion intermediate said leading edge and said lower spar and connect at the opposite end to one of said first and second trailing edge control lines, said intermediate bridle lines each having a selected length to limit said camber to a selected maximum camber when said driven element is in a high force configuration, whereby said leading edge control line changes said driven element to said high force configuration to generate power, and said leading edge control line changes said driven element to said low force configuration to pull said driven element upwind, said first and second trailing edge control lines adjust said azimuth angle, and said intermediate bridle lines control said camber.

\* \* \* \* \*

UNITED STATES PATENT AND TRADEMARK OFFICE
CERTIFICATE OF CORRECTION

| | | |
|---|---|---|
| PATENT NO. | : 7,275,719 B2 | Page 1 of 1 |
| APPLICATION NO. | : 11/673199 | |
| DATED | : October 2, 2007 | |
| INVENTOR(S) | : Gaylord G. Olson | |

It is certified that error appears in the above-identified patent and that said Letters Patent is hereby corrected as shown below:

On the title page, item (54), and Column 1, line 1 change "DRIVE" to -- DRIVEN --.

Signed and Sealed this

Twenty-seventh Day of November, 2007

JON W. DUDAS
*Director of the United States Patent and Trademark Office*